US012673573B2

(12) United States Patent
Jang et al.

(10) Patent No.: US 12,673,573 B2
(45) Date of Patent: Jul. 7, 2026

(54) APPARATUS AND METHOD FOR COMMUNICATION ASSOCIATION, POSITIONING, AND PAIRING FOR WIRELESS POWER TRANSFER

(71) Applicants: HYUNDAI MOTOR COMPANY, Seoul (KR); KIA CORPORATION, Seoul (KR)

(72) Inventors: Jin Su Jang, Hwaseong-si (KR); Hyun Je Sung, Hwaseong-si (KR); Bum Jin Kim, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 1079 days.

(21) Appl. No.: 17/824,437

(22) Filed: May 25, 2022

(65) Prior Publication Data

US 2022/0379761 A1     Dec. 1, 2022

(30) Foreign Application Priority Data

May 25, 2021   (KR) ......................... 10-2021-0066772
May 11, 2022   (KR) ......................... 10-2022-0057722

(51) Int. Cl.
*H02J 50/80*       (2016.01)
*B60L 53/126*      (2019.01)
(Continued)

(52) U.S. Cl.
CPC ............. *B60L 53/38* (2019.02); *B60L 53/126* (2019.02); *B60L 53/305* (2019.02); *B60L 53/66* (2019.02);
(Continued)

(58) Field of Classification Search
CPC ................................ B60L 53/35; B60L 53/66
(Continued)

(56) References Cited

U.S. PATENT DOCUMENTS

2015/0015419 A1*   1/2015   Halker .................. B60L 53/124
                                                          320/108
2016/0052414 A1*   2/2016   Bell ........................ B60L 53/38
                                                          320/108
(Continued)

FOREIGN PATENT DOCUMENTS

EP        2902251 A2     8/2015
EP        2902251 A3     8/2015
(Continued)

OTHER PUBLICATIONS

Extended European Search Report dated Oct. 28, 2022 issued in European Patent Application No. 22175346.

*Primary Examiner* — Ahmed H Omar
(74) *Attorney, Agent, or Firm* — Morgan Lewis & Bockius LLP

(57) ABSTRACT

A method and apparatus for an EV that receives power from an EVSE, includes receiving, by the EV, identifiable information broadcast from a plurality of EVSEs associated with at least one SECC; selecting, by the EV, one of the plurality of EVSEs as a first EVSE; performing, by the EV, wireless communication association with the first EVSE; performing, by at least one of the EV and the first EVSE, positioning until the EV is at a location capable of being charged from the first EVSE; and performing, by at least one of the EV and the first EVSE, pairing with the first EVSE so that the EV receives power from the first EVSE.

18 Claims, 27 Drawing Sheets

(51) Int. Cl.

| | | |
|---|---|---|
| *B60L 53/30* | (2019.01) | |
| *B60L 53/38* | (2019.01) | |
| *B60L 53/66* | (2019.01) | |
| *H02J 50/10* | (2016.01) | |
| *H02J 50/90* | (2016.01) | |

(52) U.S. Cl.
CPC .............. *H02J 50/10* (2016.02); *H02J 50/80* (2016.02); *H02J 50/90* (2016.02)

(58) Field of Classification Search
USPC .......................................................... 320/109
See application file for complete search history.

(56) References Cited

U.S. PATENT DOCUMENTS

| 2019/0023140 A1* | 1/2019 | Kim ......................... B60L 53/12 |
|---|---|---|
| 2019/0190320 A1* | 6/2019 | Park ......................... H02J 50/60 |
| 2020/0079237 A1 | 3/2020 | Seong et al. |
| 2020/0136438 A1 | 4/2020 | Seong |
| 2020/0136439 A1 | 4/2020 | Seong et al. |
| 2020/0164754 A1 | 5/2020 | Seong et al. |
| 2020/0338995 A1 | 10/2020 | Seong et al. |
| 2021/0136842 A1 | 5/2021 | Jang et al. |
| 2022/0146654 A1* | 5/2022 | Koga ......................... G01S 7/36 |

FOREIGN PATENT DOCUMENTS

| EP | 2985871 A1 | 2/2016 |
|---|---|---|
| EP | 3623204 A1 | 3/2020 |
| EP | 3817457 A1 | 5/2021 |
| WO | 2014/022136 A1 | 2/2014 |
| WO | 2015/009482 A2 | 1/2015 |
| WO | 2015/009482 A3 | 1/2015 |
| WO | 2018/082933 A1 | 5/2018 |

* cited by examiner

Step 1. Distance measurement
via UWB module (TDoA)

U1 = 9.43m
U2 = 7.81m
U3 = 13.04m

Step 2. Position calculation
using U1, U2, and U3

$U1^2 = (X-(-1))^2 + (Y-2)^2$
$U2^2 = (X-1)^2 + (Y-2)^2$
$U3^2 = (X-0)^2 + (Y-(-4))^2$ $\therefore X = -7m, \quad Y = 7m$

FIG. 6

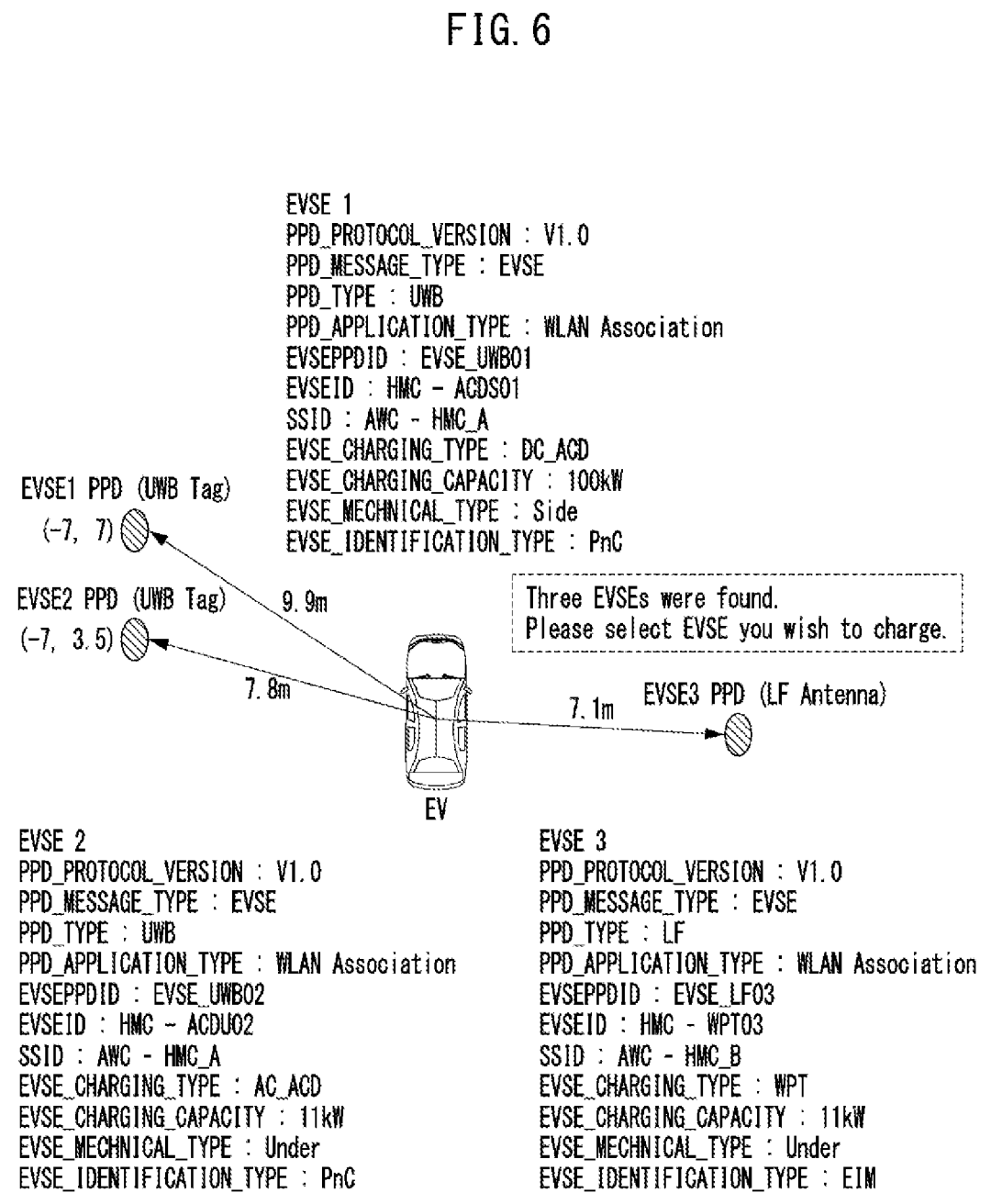

EVSE 1
PPD_PROTOCOL_VERSION : V1.0
PPD_MESSAGE_TYPE : EVSE
PPD_TYPE : UWB
PPD_APPLICATION_TYPE : WLAN Association
EVSEPPDID : EVSE_UWB01
EVSEID : HMC - ACDS01
SSID : AWC - HMC_A
EVSE_CHARGING_TYPE : DC_ACD
EVSE_CHARGING_CAPACITY : 100kW
EVSE_MECHNICAL_TYPE : Side
EVSE_IDENTIFICATION_TYPE : PnC EVSE1 PPD (UWB Tag)
(-7, 7)

EVSE2 PPD (UWB Tag)
(-7, 3.5)

9.9m 7.8m 7.1m

EVSE3 PPD (LF Antenna)

Three EVSEs were found.
Please select EVSE you wish to charge.

EV

EVSE 2
PPD_PROTOCOL_VERSION : V1.0
PPD_MESSAGE_TYPE : EVSE
PPD_TYPE : UWB
PPD_APPLICATION_TYPE : WLAN Association
EVSEPPDID : EVSE_UWB02
EVSEID : HMC - ACDU02
SSID : AWC - HMC_A
EVSE_CHARGING_TYPE : AC_ACD
EVSE_CHARGING_CAPACITY : 11kW
EVSE_MECHNICAL_TYPE : Under
EVSE_IDENTIFICATION_TYPE : PnC EVSE 3
PPD_PROTOCOL_VERSION : V1.0
PPD_MESSAGE_TYPE : EVSE
PPD_TYPE : LF
PPD_APPLICATION_TYPE : WLAN Association
EVSEPPDID : EVSE_LF03
EVSEID : HMC - WPT03
SSID : AWC - HMC_B
EVSE_CHARGING_TYPE : WPT
EVSE_CHARGING_CAPACITY : 11kW
EVSE_MECHNICAL_TYPE : Under
EVSE_IDENTIFICATION_TYPE : EIM

FIG. 7

Table: PPD Beacon Message

| Message Name | Signal Name | Size (bit) | Value | Definition |
|---|---|---|---|---|
| PPD Beacon | PPD_PROTOCOL_VERSION | 8 | Variable | PPD Protocol Version |
| | PPD_MESSAGE_TYPE | 4 | 0x0 : None, 0x1 : EV, 0x2 : EVSE, 0x3 ~ 0xF : Reserved | |
| | PPD_TYPE | 4 | 0x0 : None, 0x1 : UWB, 0x2 : LF, 0x3 : MW, 0x4 : LPE, 0x5 ~ 0xF : Reserved | |
| | PPD_APPLICATION_TYPE | 8 | 0x00 | None |
| | | | 0x01 | WLAN Association |
| | | | 0x02 | Positioning |
| | | | 0x03 | Pairing |
| | | | 0x04 | Authentication |
| | | | 0x05 ~ 0xFF | Reserved |
| | EVSEPPDID | 32 | Variable | EVSE Paring & Positioning Device IDentifier |
| | EVSEID | 36 | Variable | EVSE IDentifier |
| | SSID | 32 | Variable | Service Set IDentifier |
| | EVSE_CHARGING_TYPE | 16 | 0x00 : None, 0x01 : AC, 0x02 : DC, 0x04 : WPT, 0x08 : AC_ACD, 0x10 : DC_ACD, 0x20 : WPT_ACD, 0x40 : AC_BPT, 0x80 : DC_BPT, 0x100 : WPT_BPT, 0x200 : AC_ACD_BPT, 0x400 : DC_ACD_BPT, 0x800 : WPT_ACD_BPT, 0x1000 ~ 0x8000 : Reserved | |
| | EVSE_CHARGING_CAPACITY | 16 | Variable | EVSE Charging Capacity (kW) |
| | EVSE_MECHNICAL_TYPE | 2 | 0x0 | None |
| | | | 0x1 | Side |
| | | | 0x2 | Under |
| | | | 0x3 | Top |
| | EVSE_IDENTIFICATION_TYPE | 2 | 0x0 : None, 0x1 : EIM, 0x2 : PnC, 0x3 : EIM / PnC | |
| | RANDOM_NUMBER | 128 | Variable | Random Number (Optional) |
| | CIPHER_SUITE | 16 | Variable | Cipher Suite (Optional) |
| | SIGNATURE_VALUE | 512 | Variable | Signature Value (Optional) |

FIG. 12

Table: PPD Request Message

| Message Name | Signal Name | Size (bit) | Value | Definition |
|---|---|---|---|---|
| PPD Request | PPD_PROTOCOL_VERSION | 8 | Variable | PPD Protocol Version |
| | PPD_MESSAGE_TYPE | 4 | 0x0 : None, 0x1 : EV, 0x2 : EVSE, 0x3 ~ 0xF : Reserved | |
| | PPD_TYPE | 4 | 0x0 : None, 0x1 : UWB, 0x2 : LF, 0x3 : MV, 0x4 : LPE, 0x5 ~ 0xF : Reserved | |
| | PPD_APPLICATION_TYPE | 8 | 0x00 | None |
| | | | 0x01 | WLAN Association |
| | | | 0x02 | Positioning |
| | | | 0x03 | Pairing |
| | | | 0x04 | Authentication |
| | | | 0x05 ~ 0xFF | Reserved |
| | EVPPDID | 32 | Variable | EVSE Paring & Positioning Device IDentifier |
| | EVID | 20 | Variable | EVSE IDentifier |
| | SELECTED_EVSEPPDID | 36 | Variable | Selected EVSE Identifier by EV |
| | EV_CHARGING_TYPE | 16 | 0x00 : None, 0x01 : AC, 0x02 : DC, 0x04 : WPT, 0x08 : AC_ACD, 0x10 : DC_ACD, 0x20 : WPT_ACD, 0x40 : AC_BPT, 0x80 : DC_BPT, 0x100 : WPT_BPT, 0x200 : AC_ACD_BPT, 0x400 : DC_ACD_BPT, 0x800 : WPT_ACD_BPT, 0x1000 ~ 0x8000 : Reserved | |
| | EV_CHARGING_CAPACITY | 16 | Variable | EVSE Charging Capacity (kW) |
| | EV_MECHNICAL_TYPE | 2 | 0x0 | None |
| | | | 0x1 | Side |
| | | | 0x2 | Under |
| | | | 0x3 | Top |
| | EV_IDENTIFICATION_TYPE | 2 | 0x0 : None, 0x1 : EIM, 0x2 : PnC, 0x3 : EIM / PnC | |
| | RANDOM_NUMBER | 128 | Variable | Random Number (Optional) |
| | SIGNATURE_ALGORITHMS | 16 | Variable | Cipher Suite (Optional) |
| | SIGNATURE_VALUE | 512 | Variable | Signature Value (Optional) |

FIG. 13

Table: PPD Response Message

| Message Name | Signal Name | Size (bit) | Value | Definition |
|---|---|---|---|---|
| PPD Response | PPD_PROTOCOL_VERSION | 8 | Variable | PPD Protocol Version |
| | PPD_MESSAGE_TYPE | 4 | 0x0 : None, 0x1 : EV, 0x2 : EVSE, 0x3 ~ 0xF : Reserved | |
| | PPD_TYPE | 4 | 0x0 : None, 0x1 : UWB, 0x2 : LF, 0x3 : MV, 0x4 : LPE, 0x5 ~ 0xF : Reserved | |
| | PPD_APPLICATION_TYPE | 8 | 0x00 | None |
| | | | 0x01 | WLAN Association |
| | | | 0x02 | Positioning |
| | | | 0x03 | Pairing |
| | | | 0x04 | Authentication |
| | | | 0x05 ~ 0xFF | Reserved |
| | EVSEPPDID | 32 | Variable | Variable |
| | VERIFIED_EVPPDID | 32 | Variable | Verified EVPPD Identifier by EVSE |
| | EVSEID | 36 | Variable | EVSE IDentifier |
| | SSID | 32 | Variable | Service Set IDentifier |
| | EVSE_CHARGING_TYPE | 16 | 0x00 : None, 0x01 : AC, 0x02 : DC, 0x04 : WPT, 0x08 : AC_ACD, 0x10 : DC_ACD, 0x20 : WPT_ACD, 0x40 : AC_BPT, 0x80 : DC_BPT, 0x100 : WPT_BPT, 0x200 : AC_ACD_BPT, 0x400 : DC_ACD_BPT, 0x800 : WPT_ACD_BPT, 0x1000 ~ 0x8000 : Reserved | |
| | EVSE_CHARGING_CAPACITY | 16 | Variable | EVSE Charging Capacity (kW) |
| | EVSE_MECHANICAL_TYPE | 2 | 0x0 | None |
| | | | 0x1 | Side |
| | | | 0x2 | Under |
| | | | 0x3 | Top |
| | EVSE_IDENTIFICATION_TYPE | 2 | 0x0 : None, 0x1 : EIM, 0x2 : PnC, 0x3 : EIM / PnC | |
| | RANDOM_NUMBER | 128 | Variable | Random Number (Optional) |
| | SIGNATURE_ALGORITHMS | 16 | Variable | Cipher Suite (Optional) |
| | SIGNATURE_VALUE | 512 | Variable | Signature Value (Optional) |

Activated PPD : EV PPD Tag(212), EVSE Anchor(114a)
Deactivated PPD : EV PPD Anchor(212a), EVSE Tag(114)

Deactivated PPD

Activated PPD

FIG. 21

```
EVSE 2
PPD_PROTOCOL_VERSION : V1.0
PPD_MESSAGE_TYPE : EVSE
PPD_TYPE : UWB
PPD_APPLICATION_TYPE : Pairing
EVSEPPDID : EVSE_UWB02
VERIFIED_EVPPDID : EV_UWB01
EVSEID : HMC - ACDU02
SSID : AWC - HMC_A
EVSE_CHAGING_TYPE : AC_ACD
EVSE_CHARGING_CAPACITY : 11kW
EVSE_MECHNICAL_TYPE : Under
EVSE_IDENTIFICATION_TYPE : PnC
RANDOM_VALUE : B845F0546A648B468D466E8945A84209
SIGNATURE_ALGORITHMS : CDSA_SECP521R1_SHA512
SIGNATURE_VALUE :
A03484D23CE42F87306D12EF26B90A245C1544625F54A464E164
646E46460F62
```

FIG. 23

APPARATUS AND METHOD FOR COMMUNICATION ASSOCIATION, POSITIONING, AND PAIRING FOR WIRELESS POWER TRANSFER

CROSS-REFERENCE TO RELATED APPLICATION

The present application claims under 35 U.S.C. § 119(a) the benefit of Korean Patent Application No. 10-2021-0066772 filed on May 25, 2021, and Korean Patent Application No. 10-2022-0057722 filed on May 11, 2022, the entire contents of which is incorporated herein for all purposes by this reference.

BACKGROUND OF THE PRESENT DISCLOSURE

Field of the Present Disclosure

The present disclosure relates to a method and apparatus for communication association, positioning, and pairing for wireless power transmission, and more particularly, to a communication association, positioning, and pairing method performed when a plurality of chargers coexist and a communication association, positioning, and pairing apparatus mounted on at least one of an electric vehicle (EV) and an electric vehicle supply equipment (EVSE) that performs the same method.

Description of Related Art

An electric vehicle (EV) is driven by an electric motor powered by a battery and has advantages of reducing pollutants such as exhaust gas and noise, less breakdown, longer life, and simpler driving operation.

The EVs are classified into hybrid electric vehicles (HEVs), plug-in hybrid electric vehicles (PHEVs), and electric vehicles (EVs) according to their driving sources. The HEV has an engine as a main power and a motor as an auxiliary power. The PHEV has a motor which is a main power and an engine which is used when a battery is discharged. The EV has a motor, but no engine.

It is general for a vehicle to enter a charging station, connect to a charger/EVSE through a wireless local area network (WLAN), and perform charging. In the instant case, in a charging station where multiple chargers, charging stations, or EVSEs coexist, a problem may occur in that the vehicle may communicate with a charger/EVSE other than a charger/EVSE which is intended as a target charger/EVSE to actually perform power transfer to the EV.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are provided to substantially obviate one or more problems due to limitations and disadvantages of the related art.

Example embodiments of the present disclosure provide a communication association, positioning, and pairing method for an electric vehicle that receives power from a power supply device.

Example embodiments of the present disclosure also provide a communication association, positioning, and pairing apparatus for an electric vehicle that utilizes the communication association, positioning, and pairing method.

Example embodiments of the present disclosure also provide a protocol of a process capable of association, positioning, and pairing by a pairing and positioning device (PPD) provided on at least one side of an electric vehicle and/or electric vehicle supply equipment (EVSE) of an electric vehicle and a transmission/reception protocol for PPD messages.

According to an aspect of an exemplary embodiment of an electronic device mounted on an electric vehicle (EV) that receives power from an electric vehicle supply equipment (EVSE), the electronic device including a processor; and a memory configured to store at least one instruction to be executed by the processor. By executing the at least one instruction, the processor is configured to receive identifiable information from a plurality of EVSEs associated with at least one supply equipment communication controller (SECC), select one of the plurality of EVSEs as a first EVSE, perform wireless communication association with the first EVSE, perform positioning until the EV is at a location capable of being charged from the first EVSE, and perform pairing with the first EVSE so that the EV receives power from the first EVSE.

The electronic device may be one of a first type or a second type classified according to a distance and a relative location from a power reception device of the EV.

For the positioning, whether the EV is at the location capable of being charged from the first EVSE may be determined in cooperation with a second electronic device mounted on the EV.

For the positioning, when a distance between a power reception device of the EV and a power transmission device of the first EVSE is within a predetermined range, a location of the power transmission device may be estimated using a location of an electronic device of a first type mounted on the EV which is close to the power reception device, wherein the location of the electronic device of the first type is detected by at least one electronic device of a second type mounted on the first EVSE.

For the pairing, when it is determined as a result of the positioning that the EV is at the location capable of being charged from the first EVSE, whether the electronic device is to be deactivated may be determined according to whether the electronic device is a first type or a second type, which is classified according to a distance and a relative location from a power reception device of the EV.

For the pairing, whether or not the pairing is successful may be determined according to whether a verified EV pairing and positioning device identifier (PPDID) extracted from a message received from the first EVSE is consistent with a PPDID of the electronic device.

For the wireless communication association, whether or not the wireless communication association is successful may be determined according to whether a vendor-specific element (VSE) field of a message which is received after the first EVSE is selected is consistent with identifiable information of the first EVSE.

According to an aspect of an exemplary embodiment of an electronic device mounted on an electric vehicle supply equipment (EVSE), the electronic device including a processor; and a memory configured to store at least one instruction to be executed by the processor. By executing the at least one instruction, the processor is configured to broadcast identifiable information of the electronic device, perform positioning until an electric vehicle (EV) is at a location capable of being charged from the EVSE when wireless communication association is established with the EV that has received the broadcast identifiable information, and perform pairing with the first EVSE so that the EV receives power from the first EVSE.

The electronic device may be one of a first type or a second type classified according to a distance and a relative location from a power transmission device of the EVSE.

For the positioning, whether the EV is at the location capable of being charged from the EVSE may be determined in cooperation with a second electronic device mounted on the EVSE.

For the positioning, when a distance between a power reception device of the EV and the power transmission device is within a predetermined range, a location of the power reception device may be estimated using a location of an electronic device of a first type mounted on the EV which is close to the power reception device from an electronic device of a second type mounted on the EVSE.

For the pairing, when it is determined as a result of the positioning that the EV is at the location capable of being charged from the EVSE, whether or not the electronic device is to be deactivated may be determined d according to whether the electronic device is a first type or a second type, which is classified according to a distance and a relative location from a power transmission device of the EVSE.

For the pairing, whether the pairing is successful may be determined according to whether a selected EVSE pairing and positioning device identifier (PPDID) extracted from a message received from the EV is consistent with a PPDID of the electronic device.

A current stage among a sequence of communication association, positioning, and pairing may be indicated using a message transmitted to the EV.

According to an aspect of an exemplary embodiment of a communication association, positioning, and pairing method for an electric vehicle (EV) that receives power from an electric vehicle supply equipment (EVSE), the method including operations of receiving, by an EV, identifiable information broadcast from a plurality of EVSEs associated with at least one supply equipment communication controller (SECC); selecting, by the EV, one of the plurality of EVSEs as a first EVSE; performing, by the EV, wireless communication association with the first EVSE; performing, by at least one of the EV and the first EVSE, positioning until the EV is at a location capable of being charged from the first EVSE; and performing, by at least one of the EV and the first EVSE, pairing with the first EVSE so that the EV receives power from the first EVSE.

The method may further comprise, before the operation of performing positioning and after the operation of performing the wireless communication association, operations of receiving, by the SECC, a height from the ground of at least one first electronic device mounted on the electric vehicle; and controlling, by the SECC, an automatic connection device side (ACD-S) charging module associated with the first EVSE so that a height of at least one second electronic device from the ground mounted on the first EVSE corresponds to the height of the at least one first electronic device from the ground.

The operation of performing positioning may comprise an operation of determining, by the EV, whether the EV is at a location capable of being charged from the first EVSE in cooperation between a plurality of first electronic devices mounted on the EV and a plurality of second electronic devices mounted on the first EVSE.

When it is determined that the EV is at the location capable of being charged from the first EVSE after the operation of performing positioning, the operation of performing the pairing may comprise operations of determining whether to deactivate each of first electronic devices mounted on the EV according to whether each of the first electronic devices is a first type or a second type, which is classified according to a distance and a relative location from a power reception device of the EV; and determining whether to deactivate each of second electronic devices mounted on the first EVSE according to whether each of the second electronic devices is a first type or a second type, which is classified according to a distance and a relative location from the power transmission device of the first EVSE.

The operation of performing the pairing may comprise operations of determining, by a second electronic device mounted on the first EVSE, whether or not the pairing is successful according to whether a selected EVSE pairing and positioning device identifier (PPDID) extracted from a message received from the EV is consistent with a PPDID of a first electronic device mounted on the EV; and determining, by the first electronic device, whether or not the pairing is successful according to whether a verified EV PPDID extracted from a message received from the first EVSE is consistent with a PPDID of the second electronic device.

The operation of performing wireless communication association may comprise operations of extracting, by a first electronic device mounted on the EV, a vendor-specific element (VSE) field from a received message after selecting the first EVSE; and determining, by the first electronic device, whether or not the wireless communication association is successful according to whether the VSE field is consistent with identifiable information of the first EVSE.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 6 is a diagram illustrating a process in which an EV identifies information on associable EVSEs in a charging station and displays the information to a user according to various exemplary embodiments of the present disclosure;

FIG. 7 is a table showing information on a PPD beacon message for WLAN association according to various exemplary embodiments of the present disclosure;

FIG. 12 is a table showing information on a PPD request message for positioning according to various exemplary embodiments of the present disclosure;

FIG. 13 is a table showing information on a PPD response message for positioning according to various exemplary embodiments of the present disclosure;

FIG. 21 is a diagram illustrating a message for identifying and verifying ID information of a PPD (PPDID) selected for pairing between an electric vehicle and an EVSE according to various exemplary embodiments of the present disclosure;

FIG. 23 is a diagram showing a message transmission/reception protocol for pairing between an electric vehicle and an EVSE according to various exemplary embodiments of the present disclosure;

Figure 1:
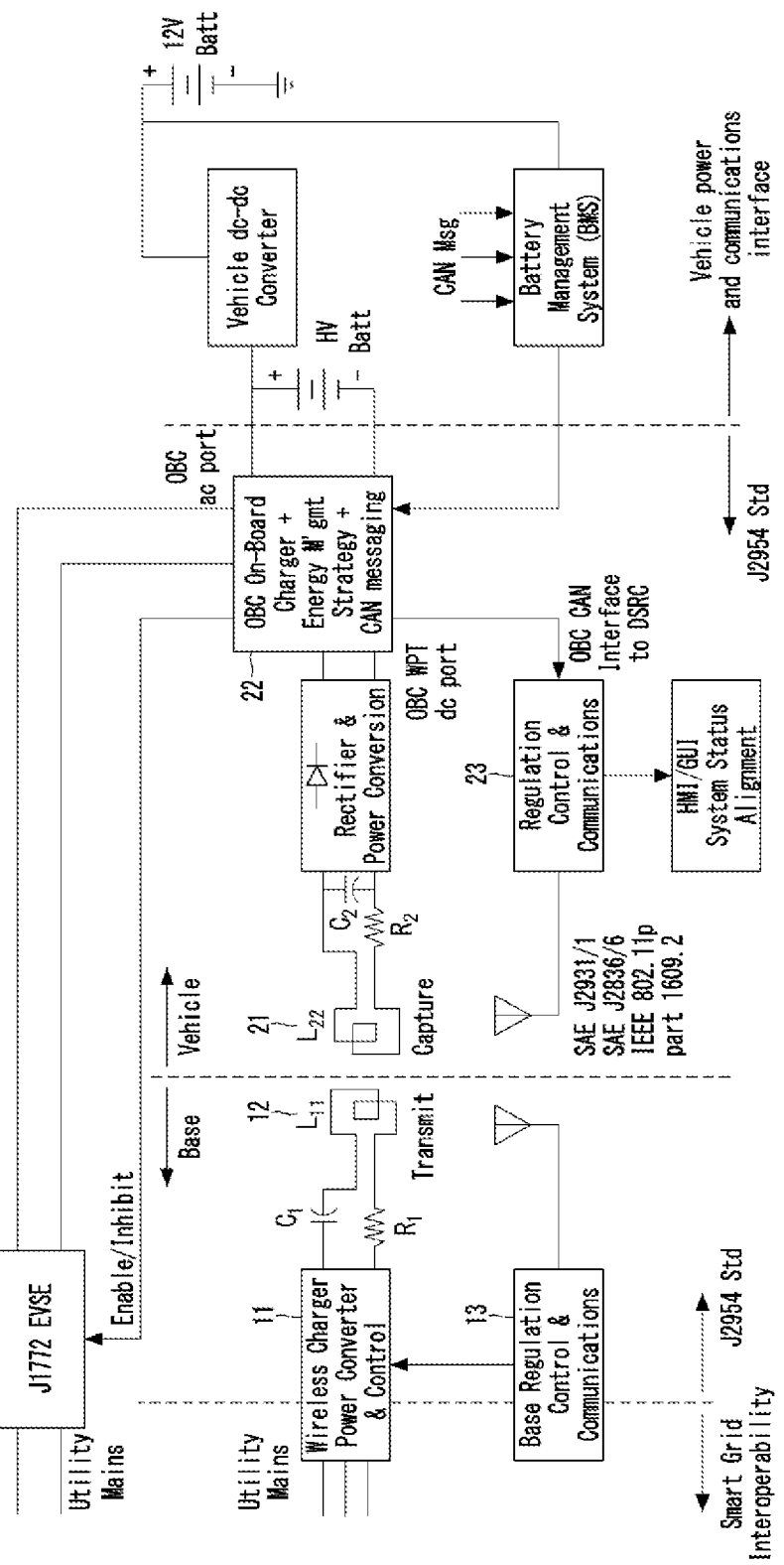
FIG. 1 is a conceptual diagram illustrating an example of a WPT system.

It may be understood that the appended drawings are not necessarily to scale, presenting a somewhat simplified representation of various features illustrative of the basic principles of the present disclosure. The predetermined design features of the present disclosure as disclosed herein, including, for example, predetermined dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

For a more clear understanding of the features and advantages of the present disclosure, various exemplary embodiments of the present disclosure will be described in detail with reference to the accompanied drawings. However, it should be understood that the present disclosure is not limited to various exemplary embodiments and includes all modifications, equivalents, and alternatives falling within the idea and scope of the present disclosure. In describing each drawing, similar reference numerals have been used for similar components.

The terminologies including ordinals such as "first" and "second" predetermined for explaining various components in the exemplary embodiment are used to discriminate a component from the other ones but are not intended to be limiting to a specific component. For example, a second component may be referred to as a first component, and similarly, a first component may also be referred to as a second component without departing from the scope of the present disclosure.

The terminologies are used herein for the purpose of describing various exemplary embodiments only and are not intended to limit the present disclosure. The singular forms include plural referents unless the context clearly dictates otherwise. Also, the expressions "~ comprises," "~ includes," "~ constructed," "~ configured" are used to refer a presence of a combination of enumerated features, numbers, processing steps, operations, elements, or components, but are not intended to exclude a possibility of a presence or addition of another feature, number, processing step, operation, element, or component.

The terms used in The present application are only used to describe various exemplary embodiments and are not intended to limit the present disclosure. As used herein, the singular expressions are intended to include plural forms as well, unless the context clearly dictates otherwise. It should be understood that the terms "comprise" and/or "comprising", when used herein, specify the presence of stated features, integers, steps, operations, elements, components, or a combination thereof but do not preclude the presence or addition of one or more features, integers, steps, operations, elements, components, or a combination thereof.

Unless defined otherwise, all terms used herein, including technical or scientific terms, have the same meaning as commonly understood by those of ordinary skill in the art to which the present disclosure pertains. Terms such as those defined in a commonly used dictionary should be interpreted as having meanings consistent with meanings in the context of related technologies and should not be interpreted as having ideal or excessively formal meanings unless explicitly defined in the present application.

Hereinafter, various embodiments of the present disclosure will be described in more detail with reference to the accompanying drawings. In describing the present disclosure, to facilitate an overall understanding thereof, the same components are assigned the same reference numerals in the drawings and are not redundantly described here. Hereinafter, various exemplary embodiments of the present disclosure will be described in detail with reference to the accompanying drawings.

In the following description and the accompanied drawings, detailed descriptions of well-known functions or configuration which may obscure the subject matter of the present disclosure will be omitted for simplicity. Also, it is to be noted that the same components are designated by the same reference numerals throughout the drawings.

Terms used in the present disclosure are defined as follows.

"Electric Vehicle (EV)": An automobile, as defined in 49 CFR 523.3, intended for highway use, powered by an electric motor that draws current from an on-vehicle energy storage device, such as a battery, which is rechargeable from an off-vehicle source, such as residential or public electric service or an on-vehicle fuel powered generator. The EV may be a four or more wheeled vehicle manufactured for use primarily on public streets or roads.

The EV may include an electric vehicle, an electric automobile, an electric road vehicle (ERV), a plug-in vehicle (PV), a plug-in vehicle (xEV), etc., and the xEV may be classified into a plug-in all-electric vehicle (BEV), a battery electric vehicle, a plug-in electric vehicle (PEV), a hybrid electric vehicle (HEV), a hybrid plug-in electric vehicle (HPEV), a plug-in hybrid electric vehicle (PHEV), etc.

"Plug-in Electric Vehicle (PEV)": An Electric Vehicle that recharges the on-vehicle primary battery by connecting to the power grid.

"Plug-in vehicle (PV)": An electric vehicle rechargeable via wireless charging from an electric vehicle supply equipment (EVSE) without using a physical plug or a physical socket.

"Heavy duty vehicle (H.D. Vehicle)": Any four-or more wheeled vehicle as defined in 49 CFR 523.6 or 49 CFR 37.3 (bus).

"Light duty plug-in electric vehicle": A three or four-wheeled vehicle propelled by an electric motor drawing current from a rechargeable storage battery or other energy devices for use primarily on public streets, roads and highways and rated at less than 4,545 kg gross vehicle weight.

"Wireless power charging system (WCS)": A system for wireless power transfer and control of interactions including operations for an alignment and communications between a ground assembly (GA) and a vehicle assembly (VA) or between a primary device and a secondary device.

"Wireless power transfer (WPT)": A transfer of electric power from a power source such as a utility, the power grid, an energy storage device, a fuel cell generator through a contactless channel such as electromagnetic induction and resonance to the EV or a transfer of the electric power from the EV to a power source.

"Utility": A set of systems which supply electrical energy and include a customer information system (CIS), an advanced metering infrastructure (AMI), rates and revenue system, etc. The utility may provide an EV with energy through rates table and discrete events. Also, the utility may provide information related to certification on EVs, interval of power consumption measurements, and tariff.

"Smart charging": A system in which EVSE and/or PEV communicate with power grid to optimize charging ratio or discharging ratio of EV by reflecting capacity of the power grid or expense of use.

"Automatic charging": A procedure in which inductive charging is automatically performed after a vehicle is located in a proper position corresponding to a primary charger assembly which may transfer power. The automatic charging may be performed after obtaining necessary authentication and right.

"Interoperability": A state in which components of a system interwork with corresponding components of the system to perform operations aimed by the system. Additionally, information interoperability may refer to capability that two or more networks, systems, devices, applications, or components may efficiently share and easily use information without causing inconvenience to users.

"Inductive charging system": A system transferring energy from a power source to an EV via a two-part gapped core transformer in which the two halves of the transformer, i.e., primary and secondary coils, are physically separated from one another. In the present disclosure, the inductive charging system may correspond to an EV power transfer system.

"Inductive coupler": The transformer formed by the coil in the GA Coil and the coil in the VA Coil that allows power to be transferred with galvanic isolation.

"Inductive coupling": A magnetic coupling between two coils. One of the two coils may refer to a ground assembly (GA) coil, and the other one of the two coils may refer to a vehicle assembly (VA) coil.

"Ground assembly (GA)": An assembly on the infrastructure side including the GA Coil, a power/frequency conversion unit and GA controller as well as the wiring from the grid and between each unit, filtering circuits, at least one housing, etc., necessary to function as the power source of a wireless power charging system. The GA may include the communication elements necessary for communication between the GA and the VA.

"Vehicle assembly (VA)": An assembly on the vehicle including the VA Coil, rectifier/power conversion unit and VA controller as well as the wiring to the vehicle batteries and between each unit, filtering circuits, at least one housing, etc., necessary to function as the vehicle part of a wireless power charging system. The VA may include the communication elements necessary for communication between the VA and the GA.

The GA may be referred to as a primary device (PD), or the like, and the VA may be referred to as a secondary device (SD), or the like.

The GA may be referred to as a supply device, a power supply side device, or the like, and the VA may be referred to as an EV device, an EV side device, or the like.

"Primary device": An apparatus which provides the contactless coupling to the secondary device. In other words, the primary device may be an apparatus external to an EV. When the EV is receiving power, the primary device may operate as the source of the power to be transferred. The primary device may include the housing and all covers.

"Secondary device": An apparatus mounted on the EV which provides the contactless coupling to the primary device. In other words, the secondary device may be provided within the EV. When the EV is receiving power, the secondary device may transfer the power from the primary battery to the EV. The secondary device may include the housing and all covers.

"GA controller": The portion of the GA which regulates the output power level to the GA Coil based on information from the vehicle.

"VA controller": The portion of the VA that monitors specific on-vehicle parameters during charging and initiates communication with the GA to adjust an output power level.

The GA controller may be referred to as a primary device communication controller (PDCC), and the VA controller may be referred to as an electric vehicle communication controller (EVCC).

"Magnetic gap": The vertical distance between the plane of the higher of the top of the litz wire or the top of the magnetic material in the GA Coil to the plane of the lower of the bottom of the litz wire or the magnetic material in the VA Coil when aligned.

"Ambient temperature": The ground-level temperature of the air measured at the subsystem under consideration and not in direct sun light.

"Vehicle ground clearance": The vertical distance between the ground surface and the lowest part of the vehicle floor pan.

"Vehicle magnetic ground clearance": The vertical distance between the plane of the lower of the bottom of the litz wire or the magnetic material in the VA Coil mounted on a vehicle to the ground surface.

"VA coil magnetic surface distance": the distance between the plane of the nearest magnetic or conducting component surface to the lower external surface of the VA coil when mounted. The present distance includes any protective coverings and additional items which may be packaged in the VA coil enclosure.

The VA coil may be referred to as a secondary coil, a vehicle coil, or a receiver coil. Similarly, the GA coil may be referred to as a primary coil, or a transmit coil.

"Exposed conductive component": A conductive component of electrical equipment (e.g., an electric vehicle) which may be touched and which is not normally energized but which may become energized when a fault occurs.

"Hazardous live component": A live component, which under certain conditions may generate a harmful electric shock.

"Live component": Any conductor or conductive component intended to be electrically energized in normal use.

"Direct contact": Contact of persons with live components. (See, IEC 61440.)

"Indirect contact": Contact of persons with exposed, conductive, and energized components made live by an insulation failure. (See, IEC 61140.)

"Alignment": A process of finding the relative position of primary device (supply device) to secondary device (EV device) and/or finding the relative position of primary device/EV device to secondary device/supply device for the efficient power transfer which is specified. In the present disclosure, the alignment may direct to a fine positioning of the wireless power transfer system.

"Pairing": A process by which a vehicle is correlated with a dedicated supply device, at which the vehicle is located and from which the power will be transferred. Pairing may include the process by which a VA controller and a GA controller of a charging spot are correlated.

The correlation/association process may include the process of association or establishment of a relationship between two peer communication entities.

Command and control communication may refer to communication between an electric vehicle power supply equipment and electric vehicle exchanging information necessary for starting, controlling, and ending a wireless power transfer process.

"High-level communication (HLC)": HLC is a special type of digital communication. HLC is necessary for additional services which are not covered by command and control communication. The data link of the HLC may use a power line communication (PLC), but the data link of the HLC is not limited to the PLC.

"Low-power excitation (LPE)": LPE refers to a technique of activating the supply device for the fine positioning and pairing so that the EV may detect the supply device, and vice versa.

"Service set identifier (SSID)": SSID is a unique identifier including 32-characters attached to a header of a packet transmitted on a wireless LAN. The SSID identifies the basic service set (BSS) to which the wireless device attempts to connect. The SSID distinguishes multiple wireless LANs. Therefore, all access points (APs) and all terminal/station devices that want to use a specific wireless LAN may use the same SSID. Devices that do not use a unique SSID are not able to join the BSS. Because the SSID is shown as plain text, the SSID may not provide any security features to the network.

"Extended service set identifier (ESSID)": ESSID is the name of the network to which one desires to connect. ESSID is similar to SSID but a more extended concept.

"Basic service set identifier (BSSID)": BSSID including 48 bits is used to distinguish a specific BSS. With an infrastructure BSS network, the BSSID may be configured for medium access control (MAC) of the AP equipment. For an independent BSS or Ad-hoc network, the BSSID may be generated with any value.

The charging station may include at least one GA and at least one GA controller configured to manage the at least one GA. The GA may include at least one wireless communication device. The charging station may refer to a place or location including at least one GA, which is provided in home, office, public place, road, parking area, etc.

In the present specification, 'association' may be used as a term to denote a procedure for establishing wireless communication between the electric vehicle communication controller (EVCC) and the supply equipment communication controller (SECC) controlling the charging infrastructure. Hereinafter, exemplary embodiments of the present disclosure will be described in detail with reference to the accompanying drawings.

Hereinafter, various exemplary embodiments of the present disclosure will be described in detail with reference to the accompanied drawings.

FIG. 1 is a conceptual diagram illustrating an example of a Wireless Power Transfer (WPT) system.

As shown in FIG. 1, an EV charging system may include a conductive charging system using a cable or a non-contact WPT system, but is not limited thereto. The EV charging system may be basically defined as a system that charges a battery mounted in an EV by use of a power of a commercial power grid or energy storage device. Such the EV charging system may have various forms according to the type of EVs.

The representative standard for wireless charging, Society of Automotive Engineers (SAE) TIR J2954, establishes an industry standard specification guideline that define interoperability, electromagnetic compatibility, minimum performance, safety, and acceptance criteria for wireless charging of light duty EVs and plug-in EVs.

Referring to FIG. 1 showing an example of a wireless charging system, a wireless communication system (WCS) according to the J2954 standard may include utility interface, high frequency power inverter, coupling coils, rectifier, filter, optional regulator, and communications connected between a vehicle energy charging/storing system and the power inverter connected to the utility. The utility interface may be similar to a conventional EVSE connection to single or three-phase AC power.

The wireless charging system for EVs may be largely classified into the following three groups.

1) GA coil 12 for power transfer, power converter 11 for grid connection, communication link 13 with a vehicle system
2) VA coil 21 having rectifying and filtering components, charging control power electronics 22 required for regulation/safety/shutdown when necessary, and communication link 23 with a base station side.
3) Secondary energy storage system, battery management system components, and related modules required for in-vehicle communication (e.g., CAN, LIN) required for battery SOC, charge rate, and other necessary information.

Figure 2:
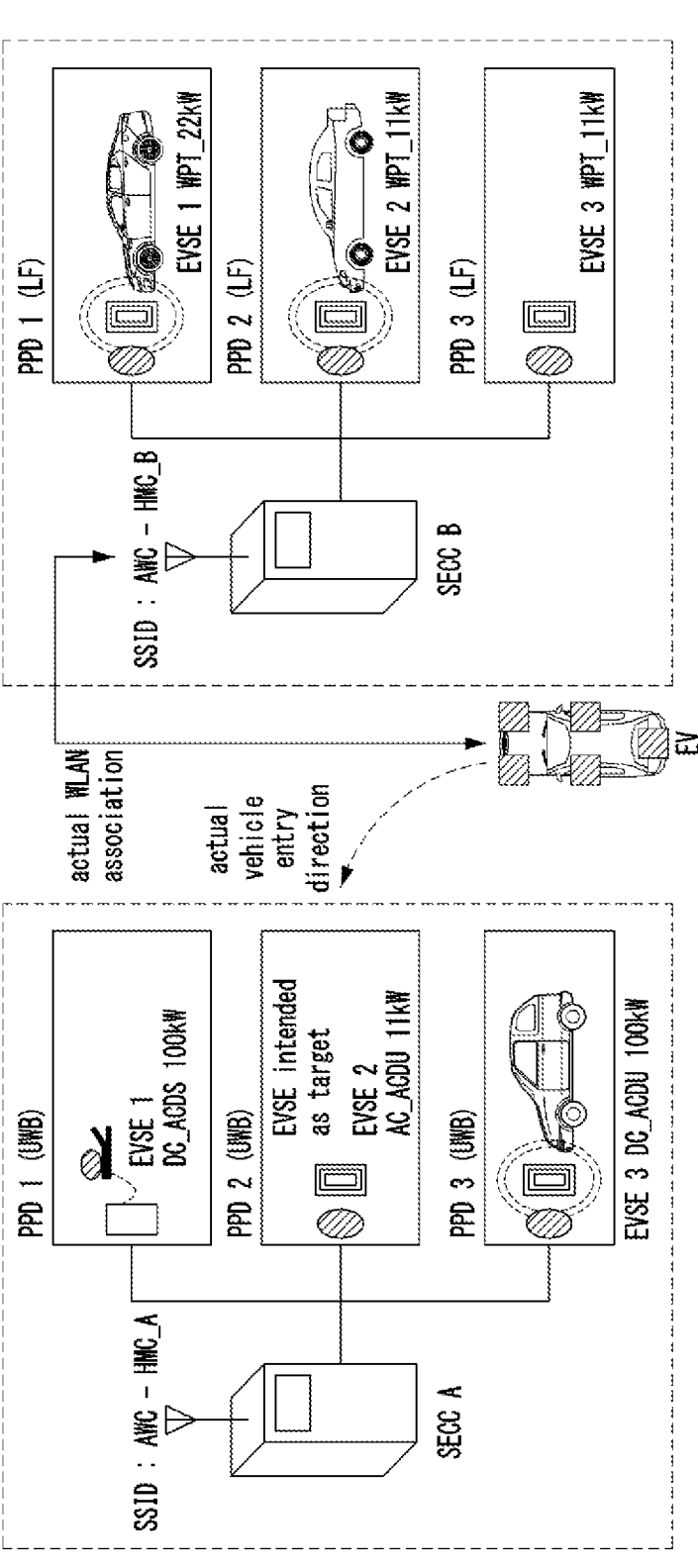
FIG. 2 is a diagram illustrating a general wireless communication association for power transmission between an electric vehicle and a charging infrastructure.

FIG. 2 is a diagram illustrating a general wireless communication association for power transmission between an electric vehicle and a charging infrastructure.

In general, for the charging of an electric vehicle, the vehicle enters a charging station, performs communication association with a charger to be used for charging using wireless LAN (WLAN) communication such as 802.11n, and then charging proceeds.

However, when a vehicle enters a charging station where multiple chargers coexist, the vehicle cannot know which charger the user wants to use for charging. Thus, a process for selecting a charger is required between the user and the vehicle before communication association.

When charging station information implemented in a DB of a charging infrastructure company server is displayed through an AVN or user smartphone app through a vehicle-side server to allow the user to select a charger directly, it is necessary to establish an LTE or 5G-based broadband communication environment between the vehicle server and the charging infrastructure company server, and also a promised protocol convention is required among various charging infrastructure companies and OEMs. Furthermore, this is not economical because users may be charged for LTE or 5G communication usage. Also, RSSI-based WLAN communication association is unreliable because a vehicle may be associated with a charger that a user does not want when there is an obstacle in the middle or the distance therebetween is far, as shown in FIG. 2.

Figure 3:
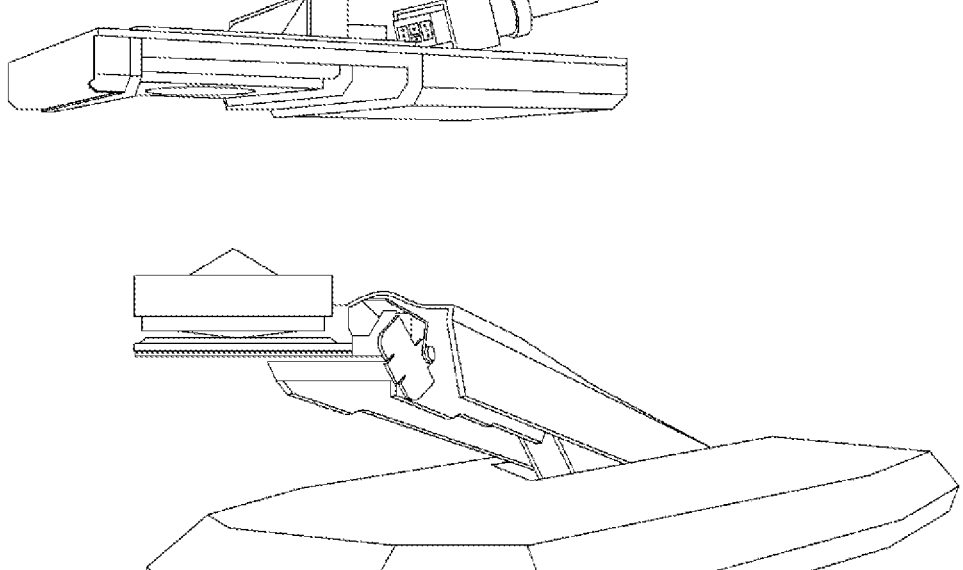
FIG. 3 is a diagram illustrating an underbody-type robot charging system, automatic connection device underbody (ACD-U) applied to an exemplary embodiment of the present disclosure.

FIG. 3 is a diagram illustrating an underbody-type robot charging system, automatic connection device underbody (ACD-U) applied to various exemplary embodiments of the present disclosure.

Figure 4:
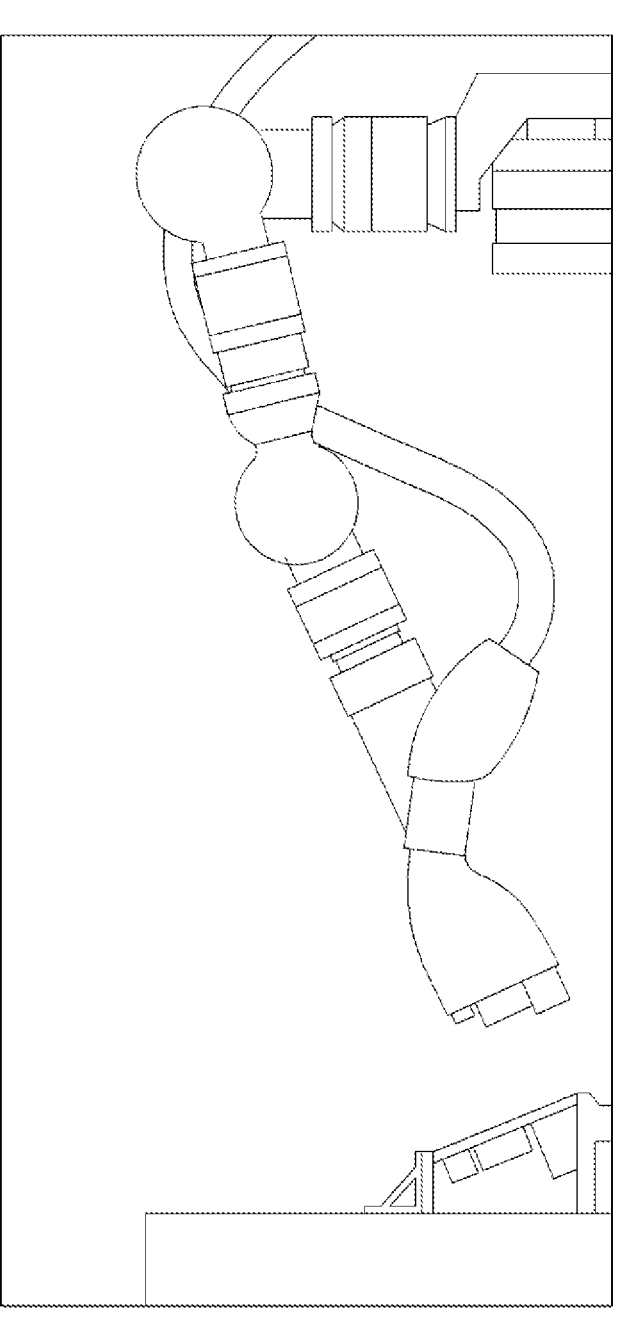
FIG. 4 is a diagram illustrating an arm-side-type robot charging system, automatic connection device side (ACD-S) applied to an exemplary embodiment of the present disclosure.

FIG. 4 is a diagram illustrating an arm-side-type robot charging system, automatic connection device side (ACD-S) applied to various exemplary embodiments of the present disclosure.

The standard 15118-8, which is an international standard related to wireless communication for electric vehicle charging, allows a vehicle to be associated with a charger AP rather than a general AP through a vendor-specific element (VSE) field of a MAC frame, which corresponds to Layer 2 in the OSI 7 layers. However, in the VSE Field of the charger/supply equipment communication controller (SECC), information on positioning and pairing is not well defined except for wireless power transmission (WPT). For the present reason, in a robot charging system based on an automatic connection device (ACD) such as the ACD-U type of FIG. 3 or the ACD-S type of FIG. 4, a vehicle cannot know whether a charger provides an appropriate positioning and pairing method only using the charger's VSE field information.

This is very inefficient because WLAN association may be continuously repeated until a pairing and positioning device (PPD) for positioning and pairing between a charger and a vehicle finds the charger matching the vehicle.

Furthermore, because the VSE field of the WLAN does not include detailed information such as maximum charging power, in a charging station where one SECC and multiple EVSEs coexist, users may not be properly associated with chargers they want to actually use for charging.

Furthermore, after a vehicle performs WLAN association with a charger/SECC, a positioning procedure should be performed for precise alignment between the vehicle and an EVSE. In the case of wireless power transmission (WPT), when a vehicle-side pad and an EVSE pad are not properly aligned, charging efficiency decreases or charging becomes impossible. Furthermore, when positioning is completed, it is necessary to check whether physical association with the EVSE to be actually associated is possible. However, when a vehicle cannot be physically associated with the EVSE to be used for charging, charging cannot be performed either. Therefore, after the WLAN association, a pairing procedure between the vehicle and the EVSE should be performed. For the present purpose, in the case of wireless charging, a method for positioning and pairing using a separate point-to-point signal (P2PS) is defined in the IEC 61950-2 standard. However, in the case of an automatic connection device (ACD)-based robot charging system as shown in FIG. 3 or FIG. 4, a separate positioning and pairing method is not yet defined in any standard.

Figure 26:
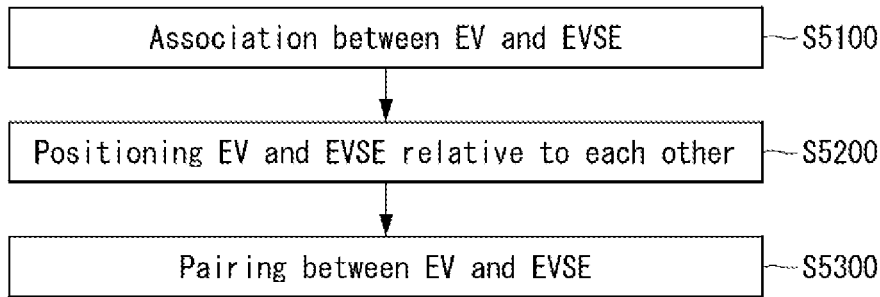
FIG. 26 is an operational flowchart illustrating an association, positioning, and pairing sequence performed using a PPD for wireless power transmission according to various exemplary embodiments of the present disclosure.

FIG. 26 is an operational flowchart illustrating an association, positioning, and pairing sequence performed using a PPD for wireless power transmission according to various exemplary embodiments of the present disclosure.

Referring to FIG. 26, communication association is performed between an electric vehicle (EV) and an electric vehicle supply equipment (EVSE) using a PPD for wireless power transmission (S5100).

After operation S5100, positioning is performed between the EV and the EVSE (S5200). The positioning between the EV and the EVSE performed in operation S5200 may be more advanced and precise than the positioning performed in operation S5100. Also, the positioning performed in operation S5200 may include aligning.

After operation S5200, pairing is performed between the EV and the EVSE (S5300).

According to various exemplary embodiments of the present disclosure, operations S5100 to S5300 may be automatically performed without user intervention, and when the result of S5300 is that the pairing is successful, only the successful result may be provided to the driver or user of the electric vehicle.

According to various exemplary embodiments of the present disclosure, when a situation in which it is difficult to proceed to the next operation (e.g., a failure) occurs in each operation S5100 to S5300, a report on the situation may be provided to the driver or user of the electric vehicle.

According to another exemplary embodiment of the present disclosure, when feedback from the driver or user of the electric vehicle is required to proceed to the next operation in each operation S5100 to S5300, a request for the feedback may be provided to the driver or user of the electric vehicle.

Each operation of FIG. 26 may be performed by a PPD mounted/installed/deployed on/in at least one of the EV and the EVSE. Each operation of FIG. 26 may be implemented by computer-executable program instructions being stored in a memory in the PPD, loaded into a processor in the PPD from a memory in the PPD, and executed by the processor in the PPD.

In various exemplary embodiments of the present disclosure, at least one operation of FIG. 26 may be performed by a cooperative operation between an EV PPD mounted on the EV and an EVSE PPD mounted on the EVSE.

In various exemplary embodiments of the present disclosure, at least one operation of FIG. 26 may be performed by a cooperative operation between a plurality of EV PPDs mounted on the EV. The plurality of EV PPDs may be classified into at least one of a first type (Tag) and a second type (Anchor) based on a distance or a relative location from a power reception device PAD of the EV.

In various exemplary embodiments of the present disclosure, at least one operation of FIG. 26 may be performed by a cooperative operation between a plurality of EVSE PPDs mounted/installed/deployed on/in the EVSE. The plurality of EVSE PPDs may be classified into at least one of a first type (Tag) and a second type (Anchor) based on a distance or a relative location from a power transmission device PAD of the EVSE.

Through the present application, there is provided a method that allows a user or a vehicle to perform positioning and pairing with a corresponding wired or wireless charging device/EVSE as well as WLAN association with a charger/SECC to be actually used for charging using a PPD for positioning and pairing at a charging station where single or multiple wired or wireless charging devices/EVSEs (e.g., wired or wireless charging pads, robot arms, etc.) are mounted/installed/deployed at a single or multiple chargers/SECCs coexisting therein. A separate PPD message transmission/reception protocol defined for a PPD-based association, positioning, and pairing method is disclosed. Also, an implementation example is included to help understand the PPD-based association, positioning, and pairing method.

A. WLAN Association

A procedure for WLAN association between a vehicle and a charger (S5100) is shown in FIGS. 5 to 10.

Figure 8:
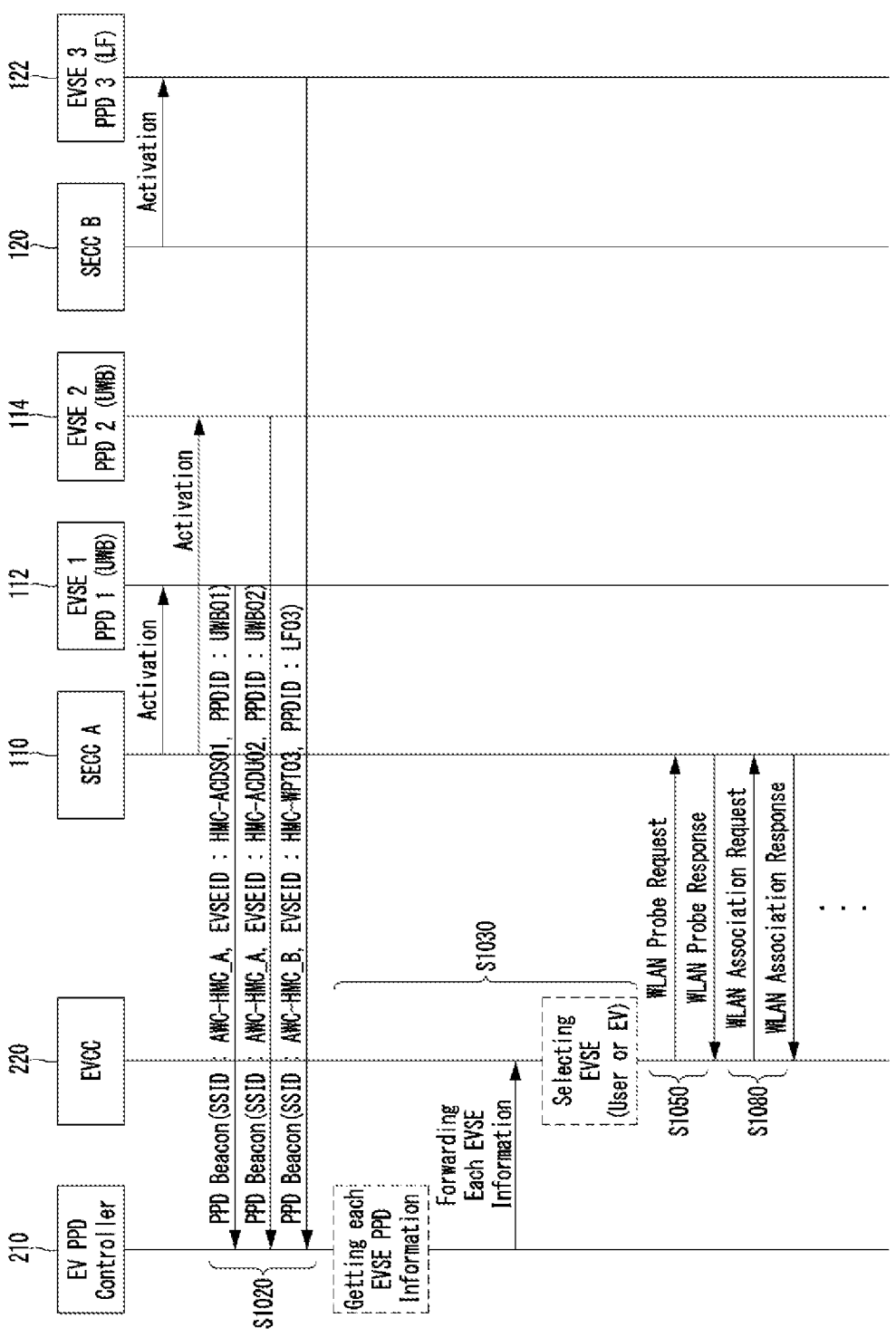
FIG. 8 is a diagram illustrating a WLAN association process by active scanning between an electric vehicle and an EVSE/SECC according to various exemplary embodiments of the present disclosure.

FIG. 8 is a diagram illustrating a WLAN association process by active scanning between an electric vehicle and an EVSE/SECC according to various exemplary embodiments of the present disclosure.

Figure 9:
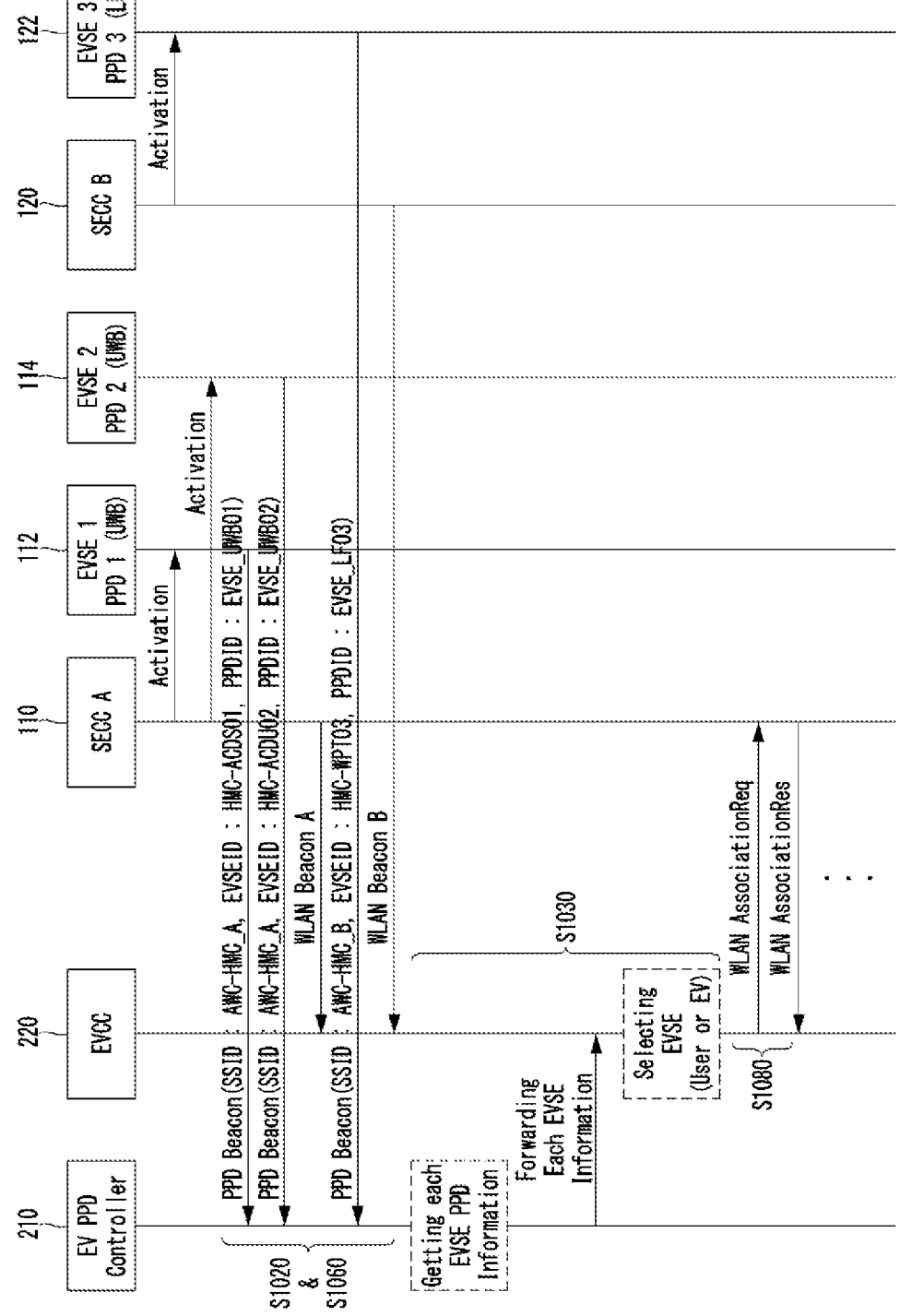
FIG. 9 is a diagram illustrating a WLAN association process by passive scanning between an electric vehicle and an EVSE/SECC according to various exemplary embodiments of the present disclosure.

FIG. 9 is a diagram illustrating a WLAN association process by passive scanning between an electric vehicle and an EVSE/SECC according to various exemplary embodiments of the present disclosure.

Figure 10:
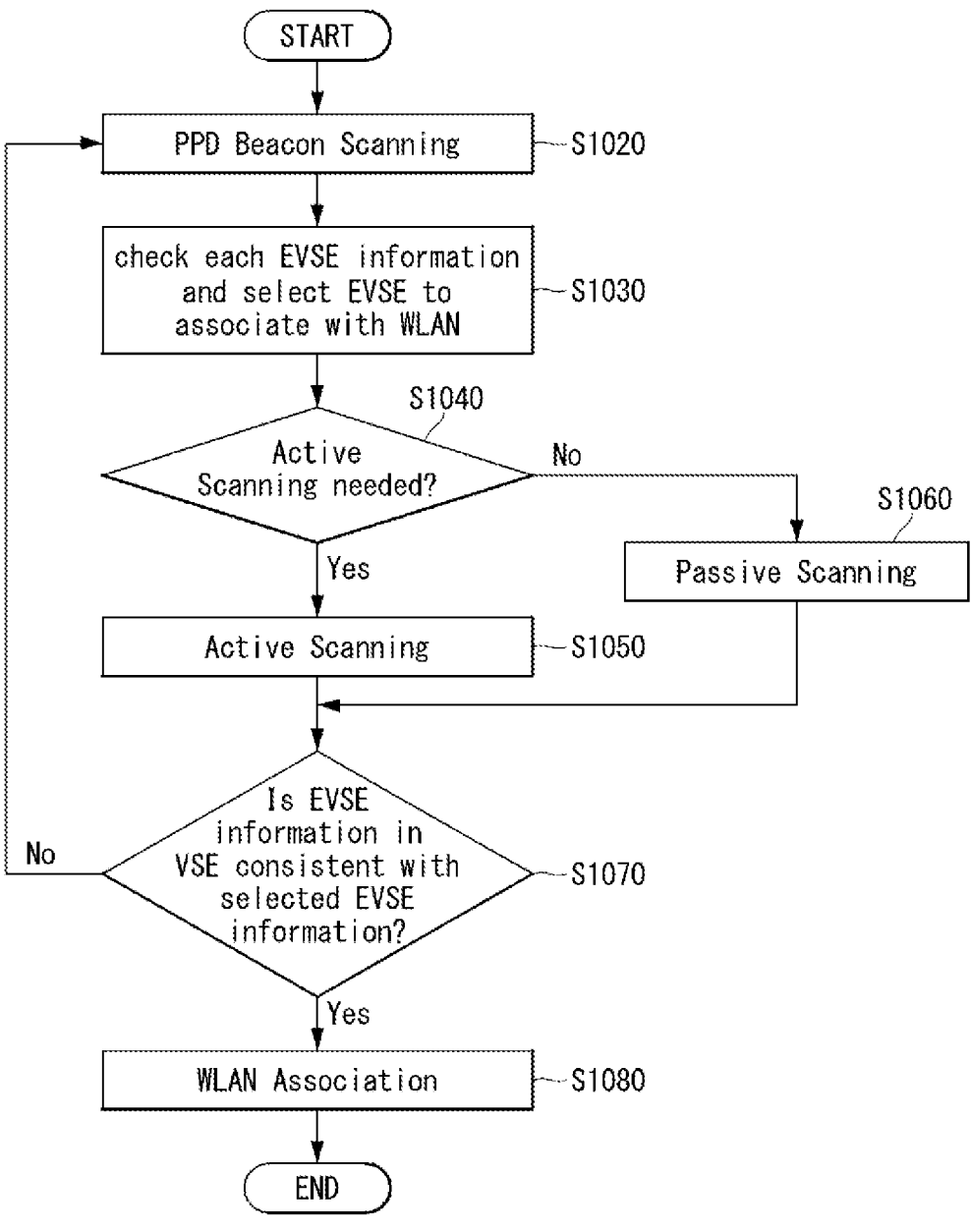
FIG. 10 is an operational flowchart illustrating a PPD-based WLAN association sequence between an electric vehicle and an EVSE/SECC according to various exemplary embodiments of the present disclosure.

FIG. 10 is an operational flowchart illustrating a PPD-based WLAN association sequence between an electric vehicle and an EVSE/SECC according to various exemplary embodiments of the present disclosure.

Referring to FIG. 8, FIG. 9 and FIG. 10, a procedure for WLAN association between a vehicle and a charger is as follows. Each operation shown in FIG. 10 may be performed by at least one of an electric vehicle communication controller (EVCC) and an EV PPD controller 210 alone or in cooperation.

For convenience of description, FIG. 8 and FIG. 9 assume that each PPD utilizes UWB communication and that PPD beacon signals are periodically broadcast.

Each charger/SECC 110 or 120 in the charging station broadcasts its SSID and detailed information of a corresponding wired or wireless charging device/EVSE through EVSE PPDs 112, 114, and 122. In the instant case, each of the EVSE PPDs 112, 114, and 122 may be understood as a PPD beacon.

A vehicle entering the charging station scans a PPD beacon by receiving each broadcasted PPD signal through an EV PPD mounted on the vehicle (S1020) and then determines EVSE information by estimating a distance and a relative location from each of the EVSE PPDs 112, 114, and 122 (S1030). There may be various methods for the present purpose, but for convenience of description, an exemplary embodiment in which a PPD utilizes UWB is illustrated. However, the spirit of the present disclosure extends to the range of design changes typically made by those skilled in the art, including the illustrated exemplary embodiments of the present disclosure, and the spirit of the present disclosure should not be interpreted as being limited to the exemplary embodiments described herein.

Figure 5:
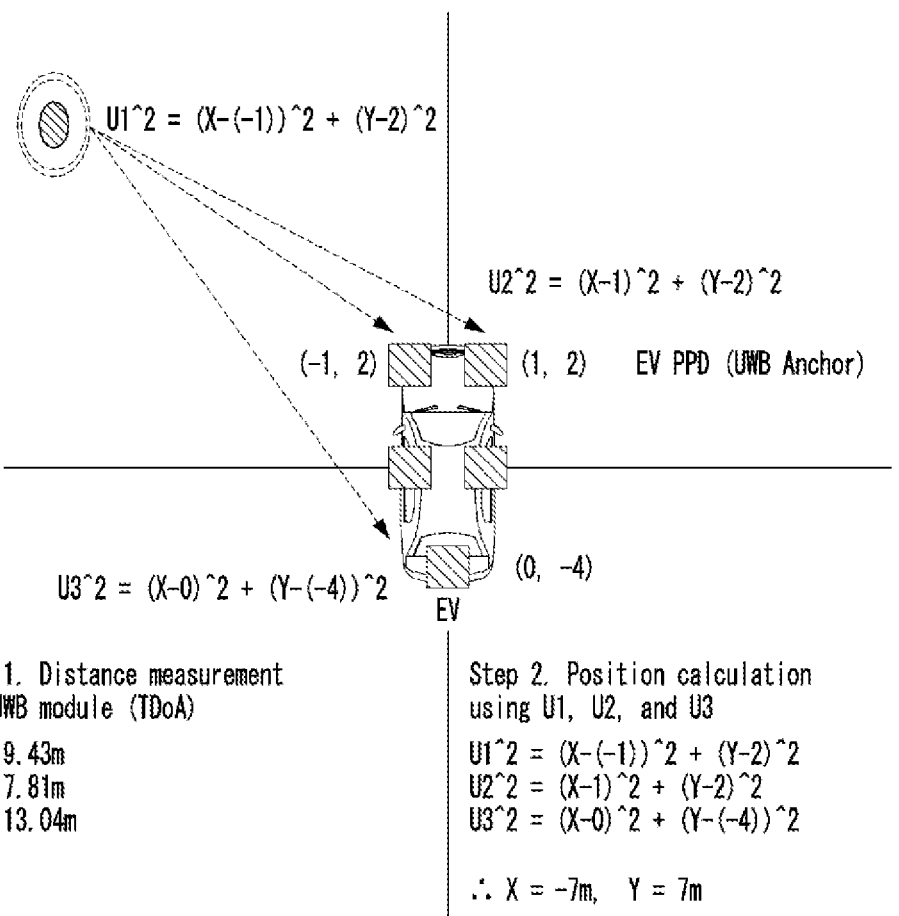
FIG. 5 is a diagram illustrating a process in which the EVSE PPD provided at the EVSE measures a distance to and a location of the EV PPD provided at the EV according to various exemplary embodiments of the present disclosure.

FIG. 5 is a diagram illustrating a process in which the EVSE PPD mounted/installed/deployed at the EVSE measures a distance to and a location of the EV PPD mounted/installed/deployed at the EV according to various exemplary embodiments of the present disclosure.

As shown in FIG. 5, the approximate distance to and location of the EVSE PPD may be estimated by use of a commonly known Time Difference of Arrival (TDoA) method through one UWB tag mounted on the EVSE and multiple UWB anchors mounted on the vehicle.

In the instant case, the number and installation locations of PPDs of the vehicle and the charger may be selected as an appropriate number and locations according to the communication technique and the positioning technique. The communication technique and the positioning technique are not limited to specific methods.

FIG. 6 is a diagram illustrating a process in which an EV identifies information on associable EVSEs in a charging station and displays the information to a user according to various exemplary embodiments of the present disclosure.

When the vehicle completes the measuring of the distances to and the locations of the EVSE PPDs 112, 114, and 122, the vehicle may induce the user to select which EVSE in the charging station to be associated with the vehicle by displaying the EVSE PPDs 112, 114, and 122 identified through a smartphone app linked to the AVN or vehicle, the distances to and relative locations from the EVSE PPDs 112, 114 and 122 (including a direction corresponding to the driving direction of the vehicle and the distance), and information on the power supply scheme of each EVSE, as shown in FIG. 6 (S1030). In various exemplary embodiments of the present disclosure, the EVSE may be displayed to the user, but the vehicle may be set to select the EVSE by itself. In an exemplary embodiment in which the vehicle is set to select the EVSE by itself, the EVSE may be automatically selected according to an EVSE selection algorithm embedded in the vehicle (S1030). That is, operation S1030 of FIG. 10 may be automatically performed according to the EVSE selection algorithm embedded in the vehicle or may be performed by providing, by the vehicle, the user with information necessary for selecting the EVSE identified and receiving the user's selection.

The EVSE selection algorithm may not be limited to a specific method. For example, after choosing EVSEs which may be used to charge the vehicle, the EVSE selection algorithm may allow an EVSE that is close to the vehicle or that has a large maximum charging power to be selected. When an EVSE with which the vehicle is to be associated is determined, the vehicle attempts wireless communication association with an SECC that controls the EVSE through the WLAN.

When it is determined which method of active scanning and passive scanning is to be performed (S1040), the following process may be performed.

First, in the case of active scanning (S1050), as shown in FIG. 8, the vehicle (the EV PPD controller 210 or EVCC 220) may perform association with an SECC having a value matched with an SSID value included in preselected EVSE information among SSID values in probe response messages received from the SECCs 110 and 120 after a probe request.

Similarly, even in the case of passive scanning (S1060), as shown in FIG. 9, when there is an SECC having a value matched with an SSID value included in preselected EVSE information among SSID values in beacon information transmitted from the SECCs 110 and 120, for example, via WLAN, the vehicle (the EV PPD controller 210 or EVCC 220) may perform association with the SECC.

The information stored in operations S1050 and S1060 may be a vendor-specific element (VSE) field in the probe response or WLAN beacon reception information. In operation S1070, the vehicle checks whether the EVSE information selected through the PPD beacon matches or is consistent with the EVSE information in the VSE of the beacon or the probe response. When VSE information does not match (e.g., is not consistent with the selected EVSE information), the vehicle may display, to the user, that WLAN association is not possible, and then may notify the user of a retry.

When VSE information matches, WLAN association is performed (S1080). Referring to FIG. 8, FIG. 9 and FIG. 10 together, operation S1080 is performed by the EVCC 220 transmitting a WLAN association request to selected SECC A 110 and SECC A 110 transmitting a WLAN association response.

In addition to the use case shown in FIG. 2, there may be various types of use cases in accordance with the layout of the charging station. However, the vehicle may be associated with an SECC that controls an EVSE a user wants through the WLAN directly, regardless of the charging station layout, by measuring the distance to and the relative location of the EVSE through received EVSE PPD information in real time, delivering detailed information on the EVSE to the user or the vehicle, and allowing the user to select an EVSE to be actually used for charging.

FIG. 7 is a table showing information on a PPD beacon message for WLAN association according to various exemplary embodiments of the present disclosure.

Referring to FIG. 7, information on the EVSE (e.g., EVSEPPDID, EVSEID, SSID, EVSE_CHARGING TYPE, EVSE_CHARGING CAPACITY), including a field (PP- D_APPLICATION_TYPE) to which stage of a PPD application the corresponding message is related, may be included in the PPD beacon message.

B. Positioning

A procedure for positioning between a vehicle and a charger (S5200) will be described below with reference to FIGS. 11 to 18.

Figure 17:
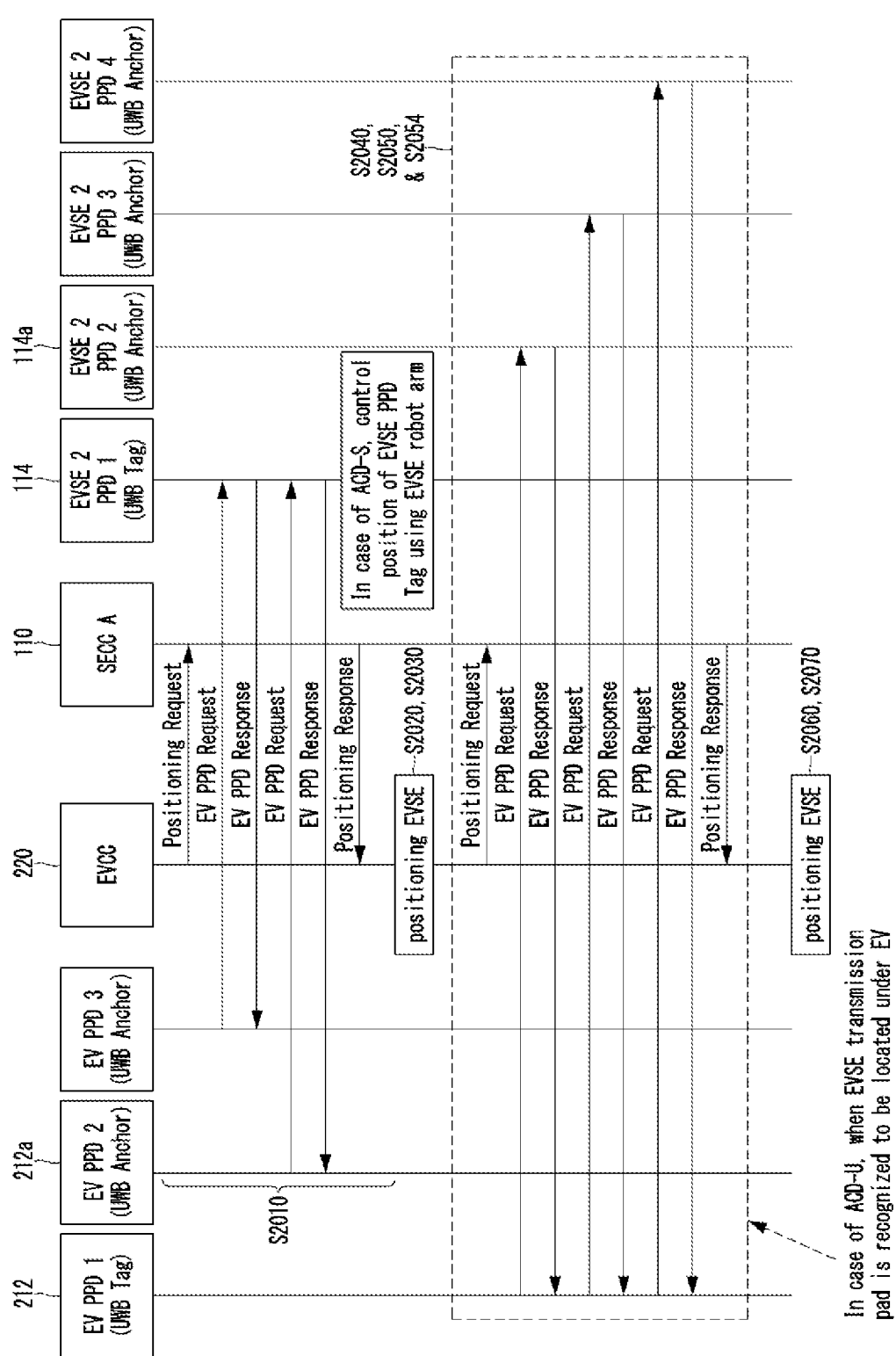
FIG. 17 is a diagram illustrating a communication protocol for positioning between an electric vehicle and an ACD-U type EVSE according to various exemplary embodiments of the present disclosure.

FIG. 17 is a diagram illustrating a communication protocol for positioning between an electric vehicle and an ACD-U type EVSE according to various exemplary embodiments of the present disclosure.

Figure 18:
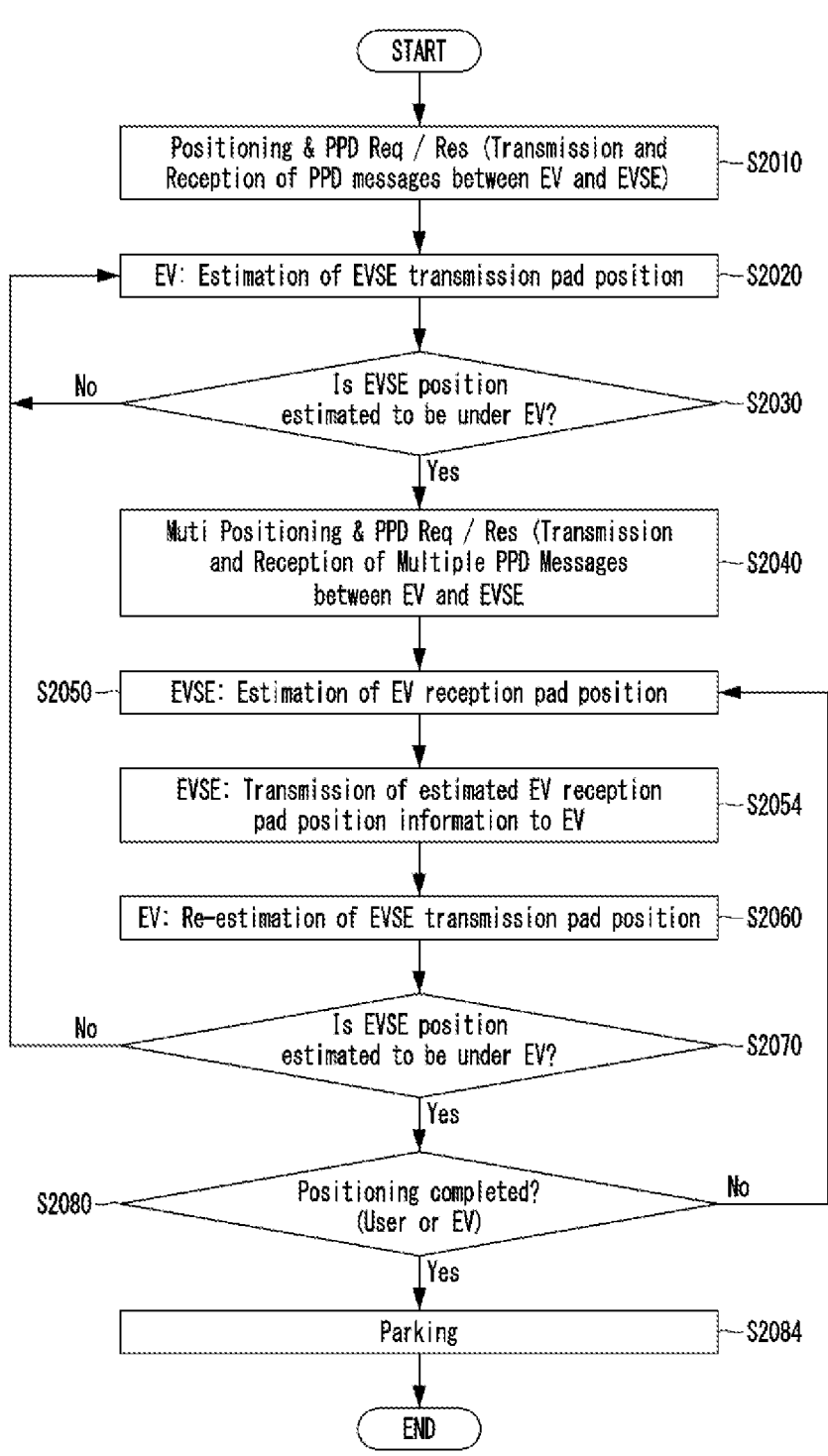
FIG. 18 is an operational flowchart showing a positioning sequence between an electric vehicle and an EVSE according to various exemplary embodiments of the present disclosure.

FIG. 18 is an operational flowchart showing a positioning sequence between an electric vehicle and an EVSE according to various exemplary embodiments of the present disclosure.

Assuming that EVSE 2 of SECC A 110 is selected by the previous WLAN association process, the subsequent positioning process is exemplarily disclosed.

When an EVSE that the user or vehicle wants to use for charging is determined and the WLAN association with the corresponding SECC 110 is completed, the EVSE-side PPD 114/114a may stop transmitting the PPD beacon message, and the vehicle may perform positioning with the EVSE intended to be actually used for charging. When a distance between a power reception device of the electric vehicle and a power transmission device of the selected EVSE is within a predetermined range, a location of the power transmission device may be estimated using a location of an electronic device of a first type (tag) mounted on the electric vehicle which is close to the power reception device, wherein the location of the electronic device of the first type is detected by at least one an electronic device of a second type (anchor) mounted on the selected EVSE.

A positioning process between an EV and an EVSE according to various exemplary embodiments of the present disclosure may be performed using a PPD message that has the structure of FIGS. 14A-14D and the information of FIG. 12, and FIG. 13.

FIG. 12 is a table showing information on a PPD request message for positioning according to various exemplary embodiments of the present disclosure.

FIG. 13 is a table showing information on a PPD response message for positioning according to various exemplary embodiments of the present disclosure.

FIGS. 14A-14D are tables showing information on the structures of the PPD request message and the PPD response message for positioning according to an exemplary embodiment of the present disclosure.

Unlike the WLAN association, a vehicle and an EVSE convert the PPD to a two-way ranging (TWR) scheme. When the vehicle transmits the PPD request message of FIG. 12, the EVSE responds using the PPD response message of FIG. 13 (S2010). Thus, the vehicle and the EVSE can determine the distance to the opposite PPD based on the time taken by giving and receiving PPD signals to or from each other and can estimate a basic relative location using a distance determined through three or more PPDs (S2020). Unlike the TDoA scheme, the present method enables location information to be rapidly updated in real time, thus allowing precise positioning. However, the well-known TWR scheme is known to consume more power than the well-known TDoA scheme, and at least one of the well-known communication methods may be selectively applied in accordance with the purpose of the present disclosure in consideration of power consumption and positioning precision.

Also, as shown in FIG. 12, and FIG. 13, since the PPD_APPLICATION_TYPE value of the EVSE PPD 114/114a is changed to 0x02 (Positioning) and transmitted, the EVSE may be excluded from selection when another vehicle enters the charging station and performs WLAN association. This is expected to greatly reduce the communication congestion when the ratio of the vehicles and the chargers in the charging station is N:N.

As shown in FIGS. 14A-14D, in the positioning process unlike the association process, the anchor status, tag status, cast type, and the like of EVPPD and EVSE PPD are additionally defined. Also, in the case of the ACD-U type, the anchor status, tag status, and cast type of an EVPPD and an EVSE PPD are defined, and in the case of the ACD-S type, the Z offset of the anchor and the Z offset of the tag are defined. Thus, it is possible to implement efficient positioning using the process of FIG. 11 which will be described below.

For precise positioning, the EV PPD may be classified into EV PPD 1 212 of the first type (Tag) close to the power reception pad and EV PPDs 2 and 3 212a of the second type (Anchor) provided at a certain distance from the power reception pad.

Likewise, the EVSE PPD of the selected EVSE 2 may be classified into EVSE PPD 1 114 of the first type (Tag) close to the power transmission pad and EV PPDs 2 and 3 114a of the second type (Anchor) provided at a certain distance from the power transmission pad.

Figure 11:
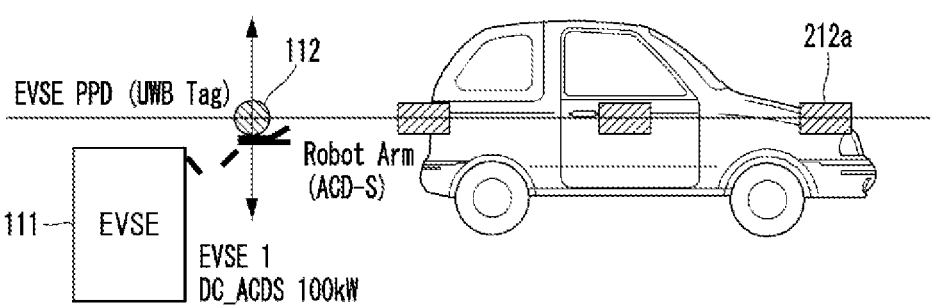
FIG. 11 is a diagram illustrating a robot-arm-based PPD location control process for positioning at the ACD-S type EVSE according to various exemplary embodiments of the present disclosure.
Figure 14A:
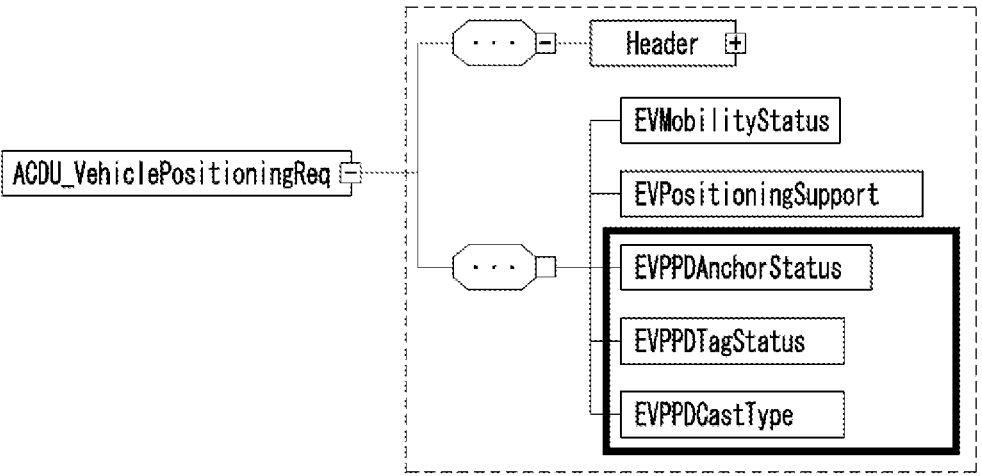
FIG. 14A through FIG. 14D are tables showing information on the structures of the PPD request message and the PPD response message for positioning according to an exemplary embodiment of the present disclosure.
Figure 14B:
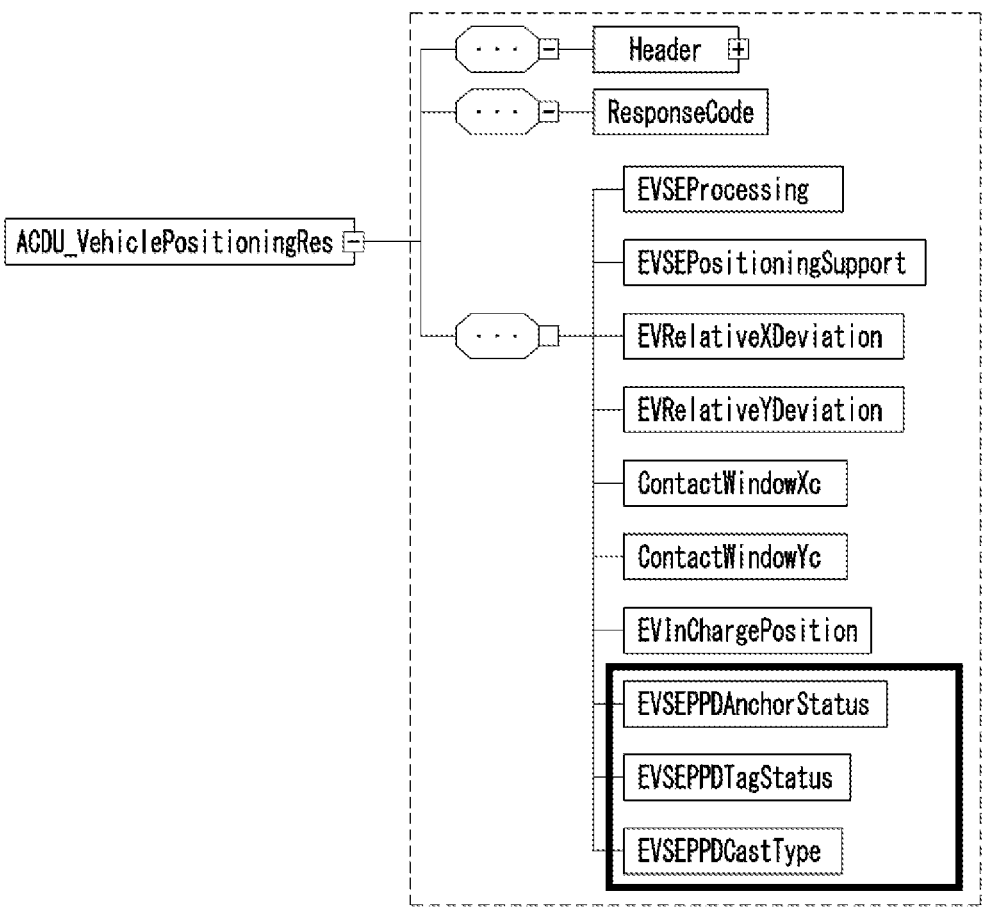
Figure 14C:
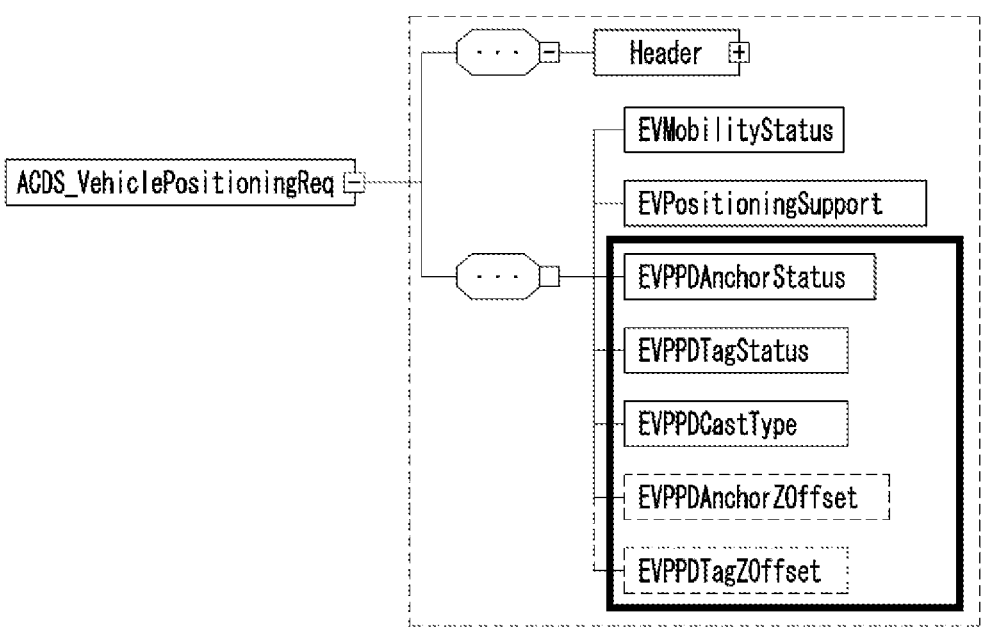
Figure 14D:
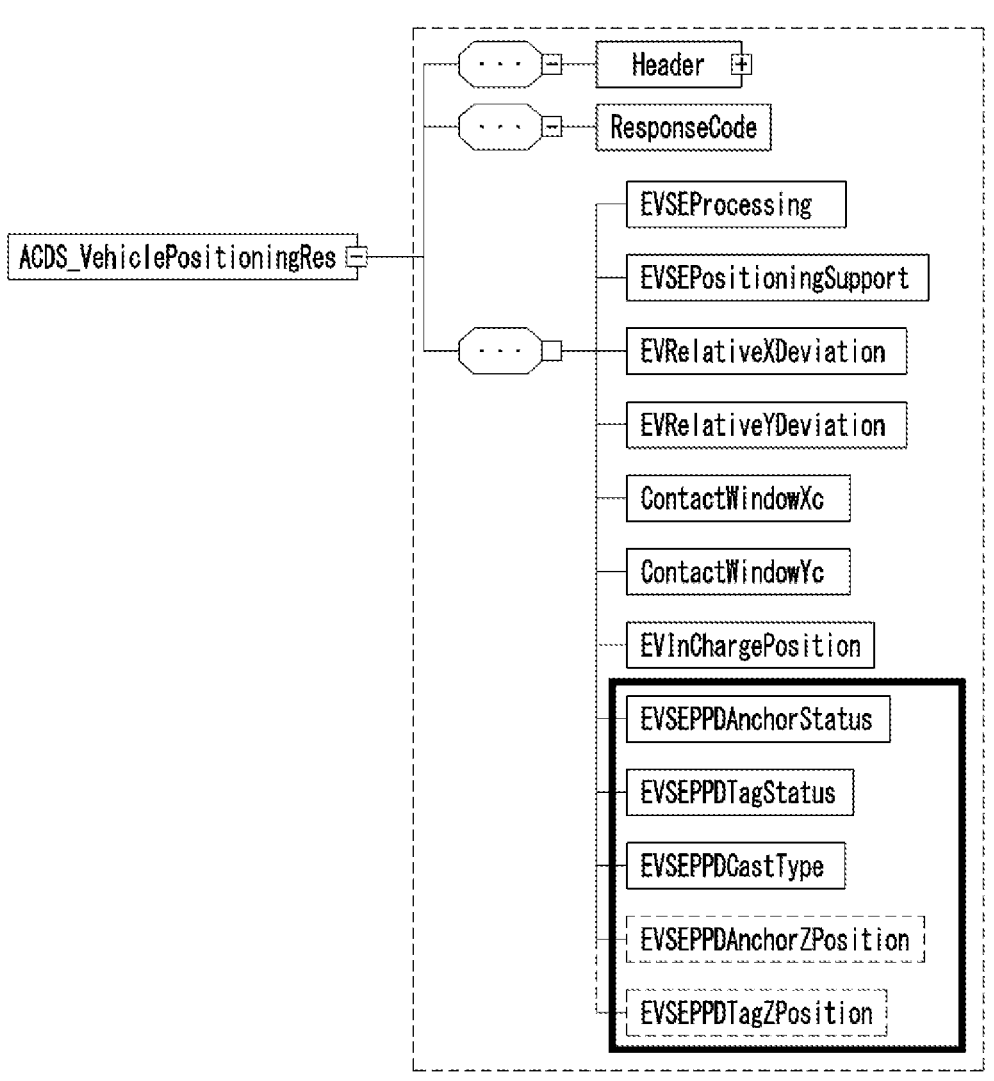

The positioning process may perform efficient positioning to suit the type of each charging device. For example, FIG. 11 is a diagram illustrating a robot-arm-based PPD location control process for positioning at the ACD-S type EVSE according to various exemplary embodiments of the present disclosure.

The ACD system may perform efficiently positioning to suit the form of the charging robot devices shown in FIG. 3 and FIG. 4. In the case of the ACD-S shown in FIG. 3, as shown in FIG. 11, a height from the ground to the vehicle PPD 212/212a is notified to the SECC through the WLAN through the ACD-S positioning request message of FIGS. 12 and 14. When the height is received, the SECC performs positioning with the vehicle after aligning the PPD 112 attached to the robot charging device to be level with the height of the vehicle PPD 212/212a. By use of the method shown in FIG. 11, it is possible to secure a faster computation time and reduce a location estimation error by reducing the burden of positioning computation in a three-dimensional space to that in a two-dimensional space.

Figure 15:
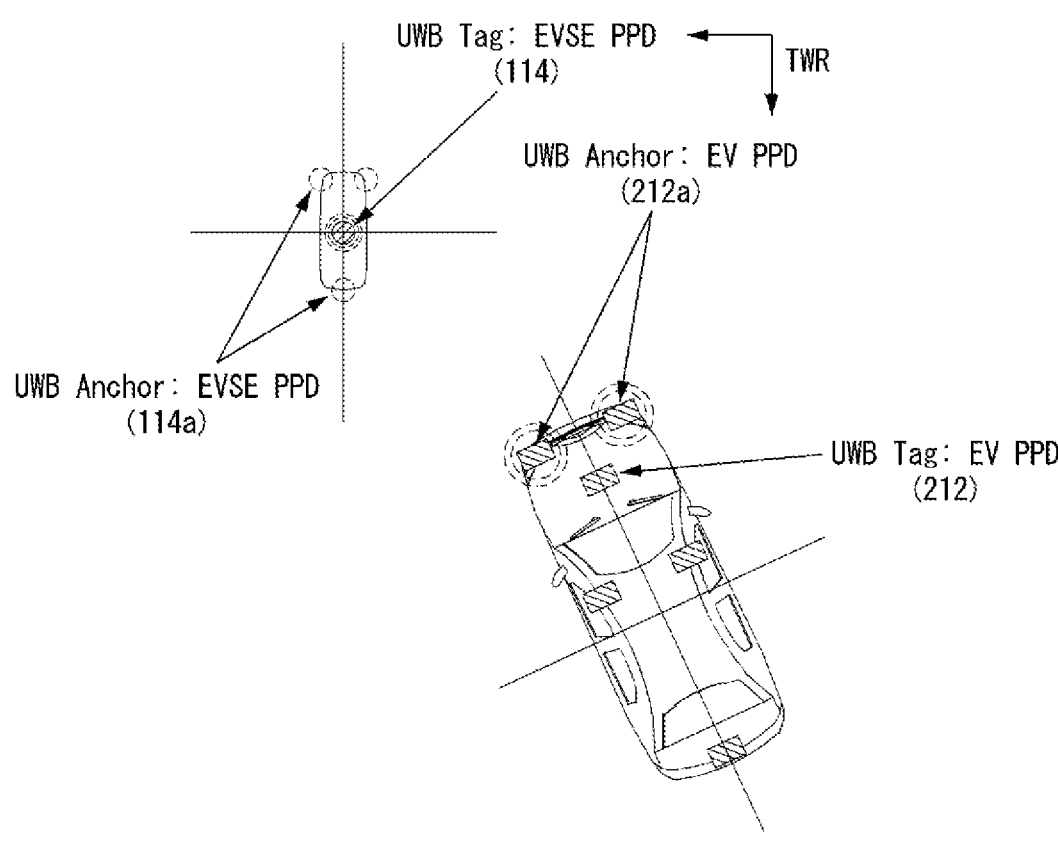
FIG. 15 and FIG. 16 are diagrams illustrating a communication process for precise positioning between an electric vehicle and an EVSE using a plurality of PPDs in the case of an ACD-U type EVSE according to various exemplary embodiments of the present disclosure.
Figure 16:
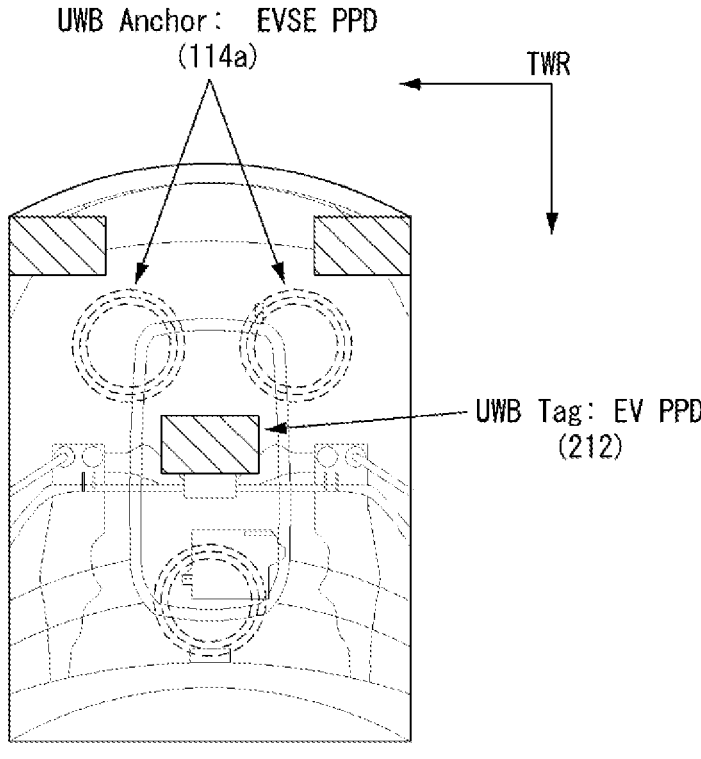

FIG. 15 and FIG. 16 are diagrams illustrating a communication process for precise positioning between an electric vehicle and an EVSE using a plurality of PPDs in the case of an ACD-U type EVSE according to various exemplary embodiments of the present disclosure.

In the case of the ACD-U type, the ACD-U positioning request and/or response message of FIG. 12, FIG. 13 and FIGS. 14A-14D is transmitted and received through WLAN communication (S2010), and the location is estimated (S2020).

As shown in FIG. 15, while the power transmission pad on the EVSE side is perceived as being located outside the vehicle through PPD multi-communication between the vehicle and the EVSE because the power transmission pad is far away from the vehicle (S2030), the location of the transmission pad on the EVSE side may be continuously estimated using an anchor EV PPD 212a provided on the outside of the vehicle (2020).

As shown in FIG. 17 and FIG. 18, while the power transmission pad on the EVSE side is recognized as being located under the vehicle (S2030), the location of the power transmission pad on the EVSE side located under the vehicle is estimated through the tag EV PPD 212 provided at the power reception pad on the vehicle side (S2040).

That is, the anchor EV PPD 212a may be provided on the outside of the vehicle, and the tag EV PPD 212 may be provided on the power reception pad (at the same location in the X-Y plane as the power reception pad). Similarly, the tag EVSE PPD 114 may be provided at the center portion of the power transmission pad on the EVSE side, and the anchor EVSE PPD 114a may be provided on the outside of the EVSE.

When the PPD request message and the PPD response message are transmitted and received in the TWR manner after the positioning is started between the vehicle and the charger (S2010), the location of the transmission pad on the EVSE side may be estimated through transmission and reception of signals from the tag EVSE PPD 114 of the transmission pad on the EVSE side to the anchor EV PPD 212a on the vehicle side (S2020).

When the tag PPD 114 of the EVSE detected by the vehicle is recognized as being located under the vehicle (S2030), the request and response messages are transmitted and received between a plurality of PPDs to perform multi-positioning, that is, multi-PPD messages are transmitted and received between the vehicle and the EVSE (S2040). Thus, the EVSE may estimate the location of the vehicle reception pad (S2050). Also, the EVSE transmits vehicle reception pad location estimation information to the vehicle (S2054), and the vehicle re-estimates the location of the EVSE transmission pad (S2060). Accordingly, the vehicle checks whether the estimated location of the EVSE is the same as the coordinates under the vehicle (S2070), and then the EVCC 220 completes the positioning automatically or through user confirmation when the estimated location of the EVSE is the same as the coordinates under the vehicle (S2080). Subsequently, the vehicle is parked (S2084), and the positioning process ends.

In operation S2060, the location of the transmission pad on the EVSE side under the vehicle may be estimated using the location value of the tag EV PPD 212 on the vehicle side reception pad detected through the anchor EVSE PPD 114a on the EVSE side.

C. Pairing

When the positioning is completed, the vehicle may perform pairing with the wired/wireless charging device/EVSE intended to be actually used for charging (S5300).

A procedure for pairing between a vehicle and a charger will be described below with reference to FIGS. 19 to 24. When it is determined as a result of the positioning that the electric vehicle is at the location capable of being charged from the selected EVSE, whether the electronic device mounted/installed/deployed on/in the electric vehicle is to be deactivated may be determined according to whether the electronic device is a first type (tag) or a second type (anchor), which is classified according to a distance and a relative location from a power reception device PAD of the electric vehicle. Similarly, whether the electronic device mounted/installed/deployed on/in the selected EVSE is to be deactivated may be determined according to whether the electronic device is a first type (tag) or a second type (anchor), which is classified according to a distance and a relative location from a power transmission device PAD of the selected EVSE.

Figure 23:
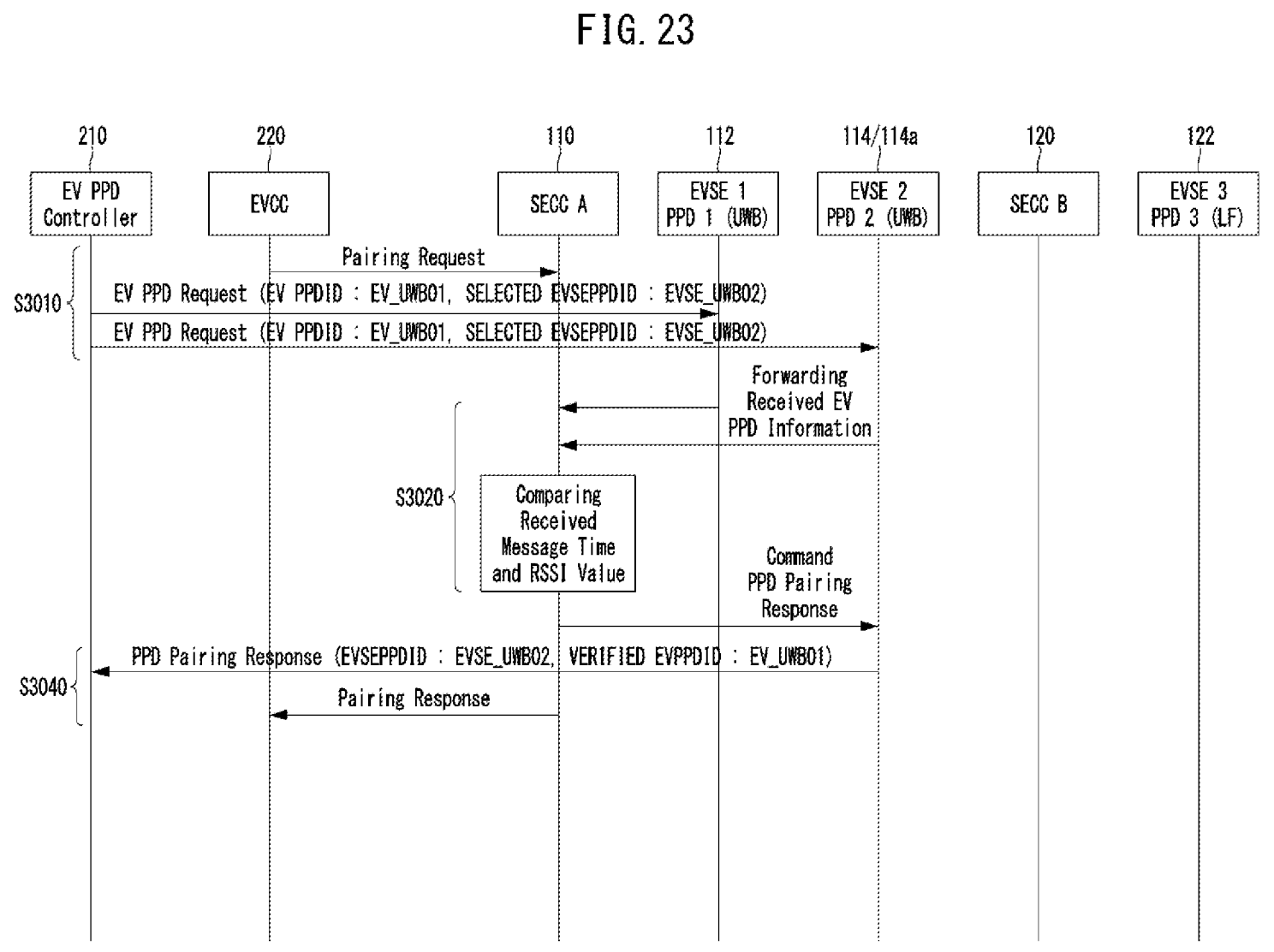

FIG. 23 is a diagram showing a message transmission/reception protocol for pairing between an electric vehicle and an EVSE according to various exemplary embodiments of the present disclosure.

Figure 24:
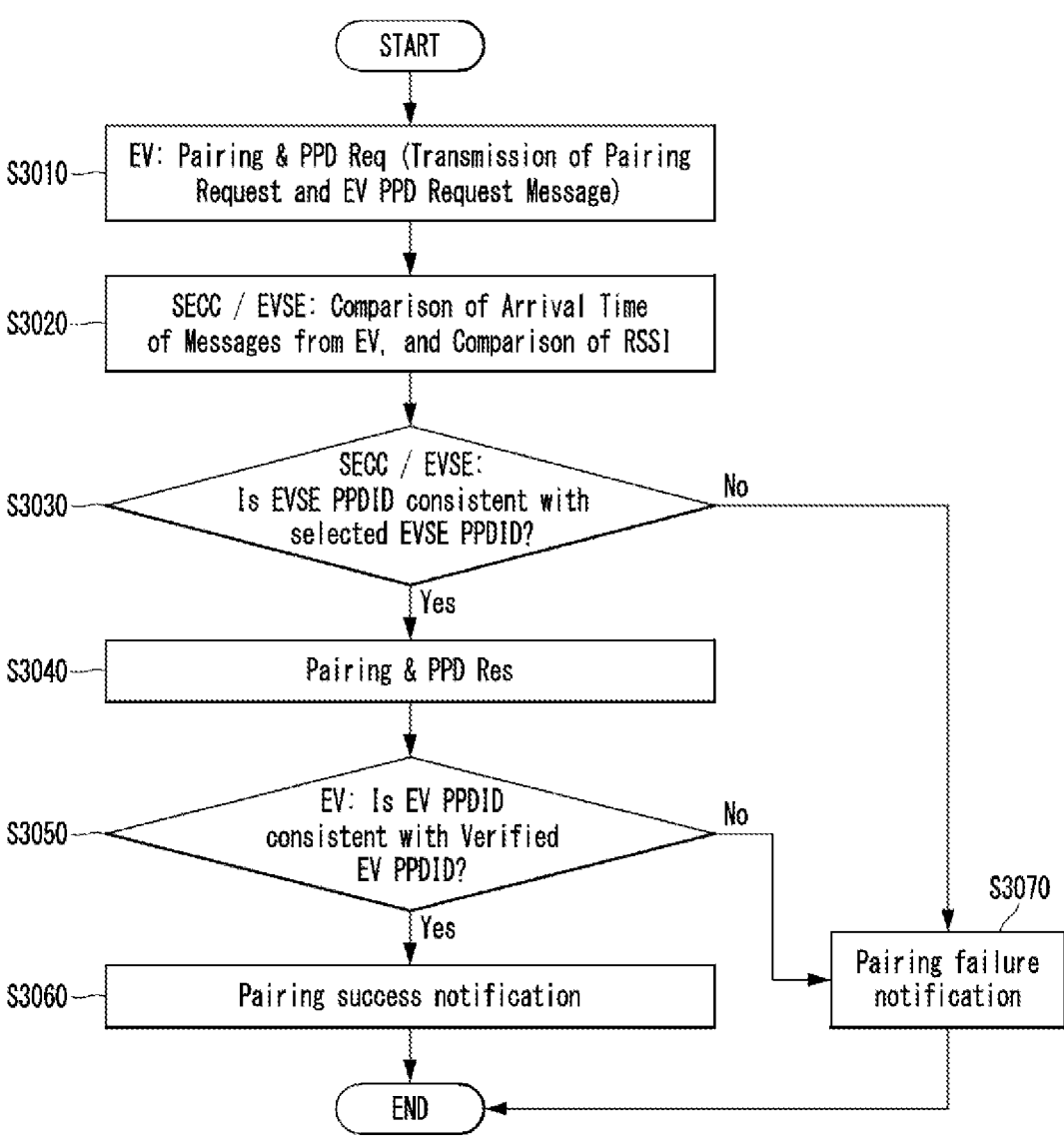
FIG. 24 is an operational flowchart showing a pairing sequence between an electric vehicle and an EVSE according to various exemplary embodiments of the present disclosure.

FIG. 24 is an operational flowchart showing a pairing sequence between an electric vehicle and an EVSE according to various exemplary embodiments of the present disclosure.

Figure 19A:
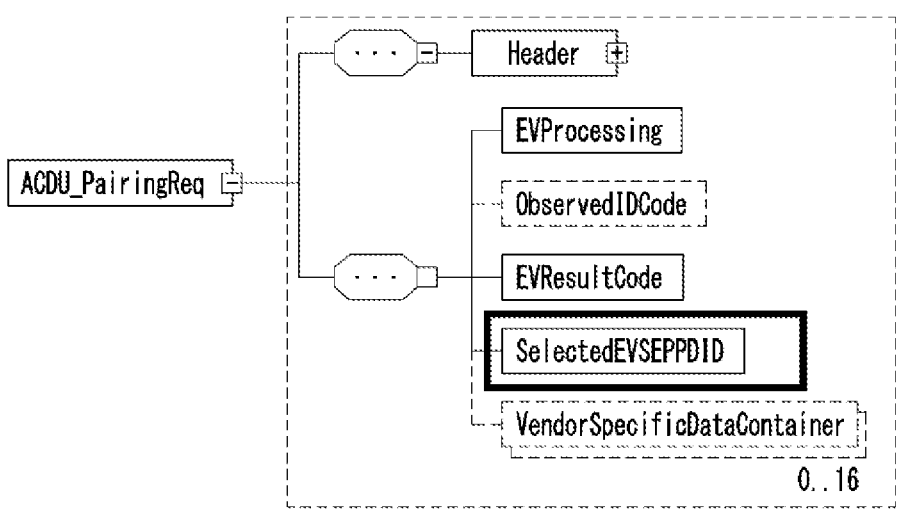
FIG. 19A and FIG. 19B are diagrams showing information on the structure of the pairing request message and response message according to various exemplary embodiments of the present disclosure.
Figure 19B:
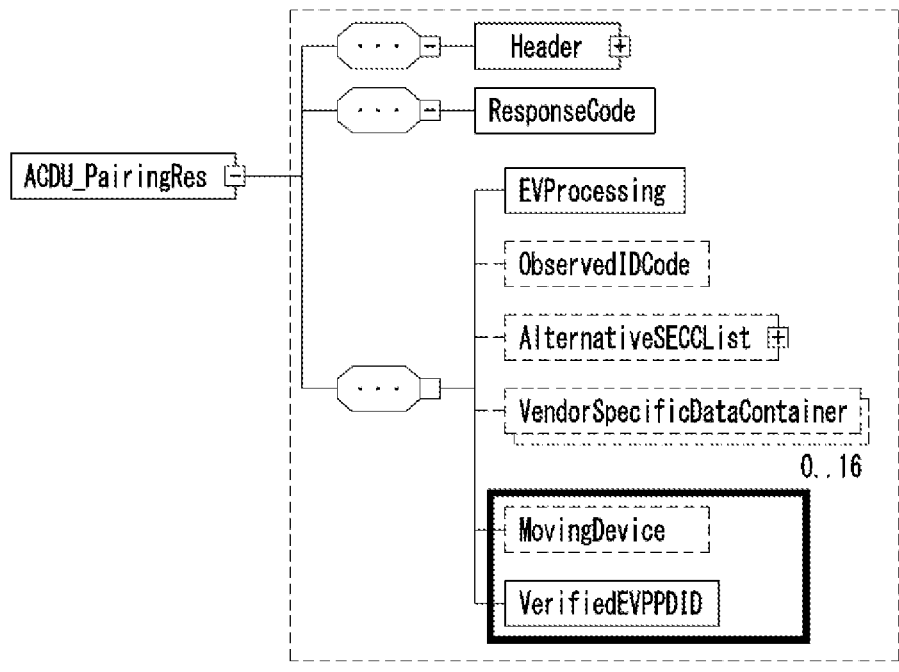

The pairing process of FIGS. 23 and 24 may be performed using the pairing request message and response message having the structure illustrated in FIGS. 19A-19B.

FIGS. 19A-19B are diagrams showing information on the structure of the pairing request message and response message according to various exemplary embodiments of the present disclosure.

Referring to FIGS. 19A-19B, the vehicle may add its own EV PPDID information and EVSE PPD information selected in the WLAN association operation to the pairing request message and send the message through WLAN communication (S3010).

At the present time, the vehicle/EVCC 220 may select an EV PPD closest to the EVSE based on the location and form of the wired/wireless charging device/EVSE and transmit the PPD request message. As shown in FIGS. 19A-19B, in the ACD-U type charging device, the pairing request message may additionally include VSE information of the selected EVSE together with the selected EVSE PPD ID.

The pairing response message may include a moving device field and a verified EV PPD ID. The success or failure of the pairing process may be determined through the verified EV PPD DD.

Figure 20:
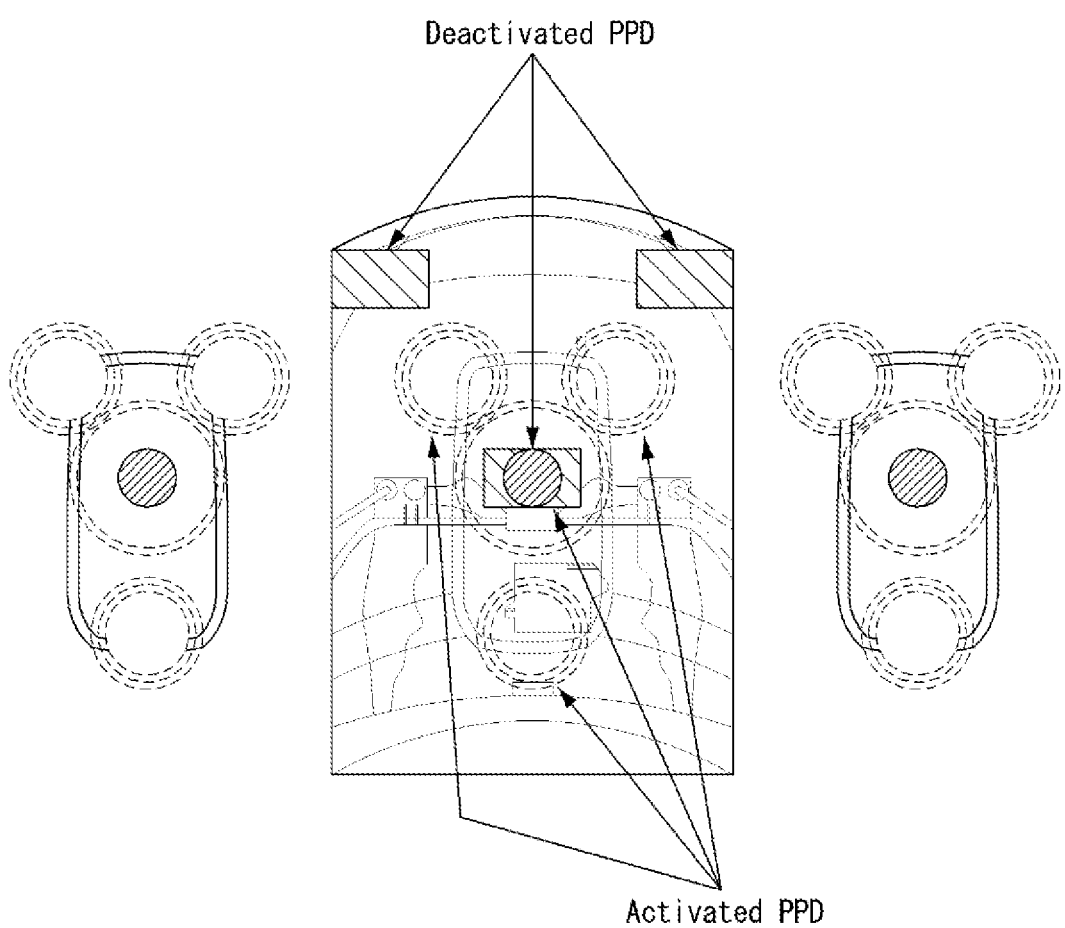
FIG. 20 is a diagram illustrating a process of selectively activating a PPD on the electric vehicle side to perform pairing between an electric vehicle and an EVSE according to various exemplary embodiments of the present disclosure.

FIG. 20 is a diagram illustrating a process of selectively activating a PPD on the electric vehicle side to perform pairing between an electric vehicle and an EVSE according to various exemplary embodiments of the present disclosure.

FIG. 21 is a diagram illustrating a message for identifying and verifying ID information of a PPD (PPDID) selected for pairing between an electric vehicle and an EVSE according to various exemplary embodiments of the present disclosure.

Figure 22:
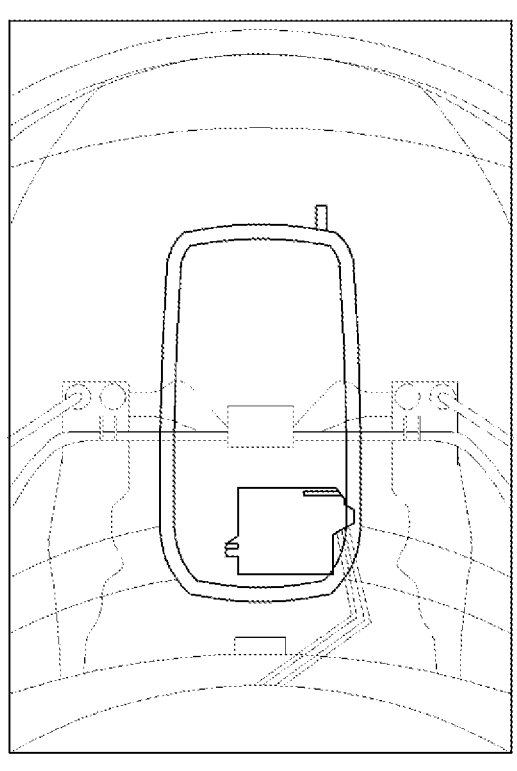
FIG. 22 is a diagram showing a user interface screen that displays, to a user, the status of pairing between an electric vehicle and an EVSE according to various exemplary embodiments of the present disclosure.

FIG. 22 is a diagram showing a user interface screen that displays, to a user, the status of pairing between an electric vehicle and an EVSE according to various exemplary embodiments of the present disclosure.

For convenience of description, an ACD-U system is illustrated. When the pairing operation is entered as shown in FIG. 20, the UWB tag PPD 212 of the power reception pad on the vehicle side may be activated, and the anchor-type EV PPD 212a on the vehicle side may be deactivated.

When the pairing operation is entered, the anchor-type EVSE PPD 114a on the EVSE side may be activated, and the tag-type EVSE PPD 114 may be deactivated.

In the following description, to help understanding, the present process may be compared to the association process and the positioning process. In the association process, through communication between the tag-type EVSE PPD 114 and the anchor-type EV PPD 212a, it is possible to perform simplified positioning and track a change in the relative location and distance between the vehicle and the EVSE. In the positioning operation, precise positioning and aligning may be performed together. In the instant case, the tag EVSE PPD 114, the anchor EVSE PPD 114a, the tag EV PPD 212, and the anchor EV PPD 212a may all be activated. In the pairing process, the tag EV PPD 212 and the anchor EVSE PPD 114a are activated, so that pairing can be performed as a preparation process for supplying wired/wireless power.

Upon receiving the pairing request message from the activated EV PPD 212, the charger/SECC 110 checks EV PPD information, reception time, and RSSI values received through the EVSE PPD anchors 112 and 114/114a managed by the charger/SECC 110 and then recognizes, as a device configured for pairing with the vehicle, the EVSE PPD 114a recognized as having the shortest message reception time or the largest RSSI value (S3020). Furthermore, after checking whether the corresponding EVSE PPDID information matches the selected EVSE PPDID information received from the vehicle (S3030), the charger/SECC 110 transmits the PPD response message and the pairing response message to the vehicle (S3040) At the instant time, the SECC 110 sends the EV PPDID information received from the vehicle as it is, and changes the PPD_APPLICATION_TYPE in the PPD response message to Pairing (0x03). In the instant case, the SECC 110 transmits a pairing response message including the received EV PPDID information. Furthermore, the SECC 110 transmits a PPD response message through the EVSE PPD 114A recognized in operation S3020, that is, the EVSE PPD 114a of the EVSE recognized as having the shortest EV PPD request message reception time or the largest RSSI value (S3040).

When the pairing response message received through the WLAN is normal and EV PPDID information included in the pairing response message, that is, a verified EV PPDID, matches its own EV PPDID (S3050), the vehicle may determine that the corresponding EVSE has been paired and then display, to the user, that the pairing is successful or in progress (S3060) as shown in FIG. 22. If the information does not match in operation S3030 or S3050, the vehicle may display a pairing failure to the user (S3070). Referring to the message structure of FIGS. 19A-19B, after the pairing fails, the process after operation S3020 may be performed again with reference to an alternative SECC list.

In various exemplary embodiments of the present disclosure, for the vehicle to optionally check the authenticity and integrity of a message transmitted by the PPD of the EVSE, the EVSE signs a random number received from the vehicle and sends the random number in the PPD message. The signing algorithm may use a signing algorithm which is promised between the EV and the EVSE, and supportable signing algorithms in each PPD message may be displayed.

Referring to FIGS. 19 and 21, an ACD system may additionally check pairing based on a change in the RSSI value and the reception time of the EV PPD signal received from the vehicle while moving the robot on the EVSE side.

Figure 25:
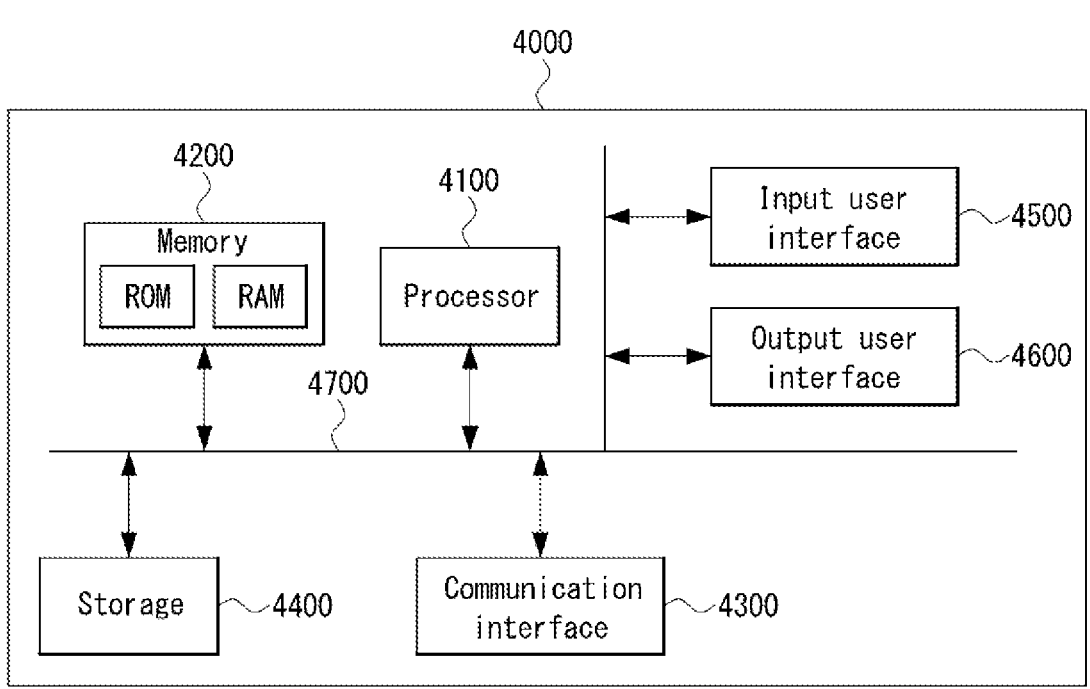
FIG. 25 is a block diagram showing a generalized configuration of a PPD for wireless power transmission according to various exemplary embodiments of the present disclosure.

FIG. 25 is a block diagram showing a generalized configuration of a PPD for wireless power transmission according to various exemplary embodiments of the present disclosure.

A PPD 4000 for WPT shown in an exemplary embodiment shown in FIG. 25 may be one of the EV PPD 212, 212a deployed in the EV, EVSE PPD 112, 114, 114a, 122 deployed in the EVSE. The PPD 4000 may include at least one processor 4100, a memory 4200 storing at least one instruction executable by the processor 4100, and a communication interface 4300 connected to a network to perform communication. The PPD 4000 for WPT may further include a storage device 4400 configured for storing at least one program instruction causing the operations described above and/or data generated due to the execution of the program instruction. The PPD 4000 for WPT may further include an input interface device 4500, and an output interface device 4600 for interaction with user. The components included in the PPD 4000 may be connected by a system bus 4700 to communicate with each other.

The processor 4100 may execute the at least one instruction stored in at least one of the memory 4200 and the storage device 4400. The processor 4100 may refer to a central processing unit (CPU), a graphics processing unit (GPU), or a dedicated processor on which the methods according to the exemplary embodiments of the present disclosure are performed. Each of the memory 4200 and the storage device 4400 may be configured as at least one of a volatile storage medium and a nonvolatile storage medium. For example, the memory 4200 may be configured with at least one of a read only memory (ROM) and a random access memory (RAM).

The program instructions may include operations of receiving, by an EV, identifiable information broadcast from a plurality of EVSEs associated with at least one supply equipment communication controller (SECC); selecting, by the EV, one of the plurality of EVSEs as a first EVSE; performing, by the EV, wireless communication association with the first EVSE; performing, by at least one of the EV and the first EVSE, positioning until the EV is at a location capable of being charged from the first EVSE; and performing, by at least one of the EV and the first EVSE, pairing with the first EVSE so that the EV receives power from the first EVSE.

The program instructions may further include, before the operation of performing positioning and after the operation of performing the wireless communication association, operations of receiving, by the SECC, a height from the ground of at least one first electronic device mounted on the electric vehicle; and controlling, by the SECC, an automatic connection device side (ACD-S) charging module associated with the first EVSE so that a height of at least one second electronic device from the ground mounted on the first EVSE corresponds to the height of the at least one first electronic device from the ground.

The program instructions of operation of performing positioning may include an operation of determining, by the EV, whether the EV is at a location capable of being charged from the first EVSE in cooperation between a plurality of first electronic devices mounted on the EV and a plurality of second electronic devices mounted on the first EVSE.

The program instructions of operation of performing pairing may include, when it is determined that the EV is at the location capable of being charged from the first EVSE after the operation of performing positioning, operations of determining whether to deactivate each of first electronic devices mounted on the EV according to whether each of the first electronic devices is a first type or a second type, which is classified according to a distance and a relative location from a power reception device of the EV; and determining whether to deactivate each of second electronic devices mounted on the first EVSE according to whether each of the second electronic devices is a first type or a second type, which is classified according to a distance and a relative location from the power transmission device of the first EVSE.

The program instructions of operation of performing the pairing may include operations of determining, by a second electronic device mounted on the first EVSE, whether or not the pairing is successful according to whether a selected EVSE pairing and positioning device identifier (PPDID) extracted from a message received from the EV is consistent with a PPDID of a first electronic device mounted on the EV; and determining, by the first electronic device, whether or not the pairing is successful according to whether a verified EV PPDID extracted from a message received from the first EVSE is consistent with a PPDID of the second electronic device.

The program instructions of operation of performing wireless communication association may include operations of extracting, by a first electronic device mounted on the EV, a vendor-specific element (VSE) field from a received message after selecting the first EVSE; and determining, by the first electronic device, whether or not the wireless communication association is successful according to whether the VSE field is consistent with identifiable information of the first EVSE.

According to an exemplary embodiment of the present disclosure, WLAN association may be conveniently performed based on a PPD and a charger/EVSE/SECC intended to be actually used for charging at a charging station where multiple chargers are provided. Also, according to an exemplary embodiment of the present disclosure, positioning and pairing may be conveniently performed based on a PPD at a charging station where a plurality of SECCs coexist and a single or multiple EVSEs (wired and wireless charging pads, robot arms, etc.) are provided in the corresponding SECCs.

Also, according to an exemplary embodiment of the present disclosure, additional functions for charging an electric vehicle may be provided by utilizing a provided PPD communication message. The additional functions may include, for example, user authentication, electronic signature, etc.

According to an exemplary embodiment of the present disclosure, automatic association between an electric vehicle and a charging station, automatic positioning, and automatic pairing are possible without additional user intervention (e.g., charger communication association using audio, video, and navigation (AVN) or an app). Also, according to an exemplary embodiment of the present disclosure, there is no need to separately configure additional hardware (H/W) by use of a plurality of PPDs provided near a wireless charging transmission/reception pad (PAD).

Also, the present disclosure may be implemented in a vehicle and a charger that are configured for wireless communication. Also, the present disclosure may be implemented in a vehicle and a charger that provide a PPD. Also, the present disclosure may be implemented in an autonomous vehicle capable of wired/wireless charging.

According to various exemplary embodiments of the present disclosure, it is possible for a vehicle to be automatically associated with a charger to be used for charging at a charging station where one or more chargers coexist.

According to various exemplary embodiments of the present disclosure, it is possible to perform association, positioning, and pairing all at one time by use of a pairing and positioning device (PPD) provided on at least one side of an electric vehicle or electric vehicle supply equipment (EVSE).

As mentioned above, the apparatus and method according to exemplary embodiments of the present disclosure may be implemented by computer-readable program codes or instructions stored on a non-transitory computer-readable recording medium. The non-transitory computer-readable recording medium includes all types of recording media storing data readable by a non-transitory computer system. The computer-readable recording medium may be distributed over computer systems connected through a network so that a computer-readable program or code may be stored and executed in a distributed manner.

The non-transitory computer-readable recording medium may include a hardware device specially configured to store and execute program commands, such as ROM, RAM, and flash memory. The program commands may include not only machine language codes such as those produced by a compiler, but also high-level language codes executable by a computer using an interpreter or the like.

Some aspects of the present disclosure have been described above in the context of a device but may be described using a method corresponding thereto, blocks or the device corresponds to operations of the method or characteristics of the operations of the method. Similarly, aspects of the present disclosure described above in the context of a method may be described using blocks or items corresponding thereto or characteristics of a device corresponding thereto. Some or all of the operations of the method may be performed, for example, by (or using) a hardware device such as a microprocessor, a programmable computer or an electronic circuit. In some exemplary embodiments of the present disclosure, at least one of most important operations of the method may be performed by such a device.

In some exemplary embodiments of the present disclosure, a programmable logic device such as a field-programmable gate array may be used to perform some or all of functions of the methods described herein. In some exemplary embodiments of the present disclosure, the field-programmable gate array may be operated with a microprocessor to perform one of the methods described herein. In general, the methods are performed by a certain hardware device.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An electronic device mounted on an electric vehicle (EV) that receives power from an electric vehicle supply equipment (EVSE), the electronic device comprising:
   a processor; and
   a memory configured to store at least one instruction to be executed by the processor,
   wherein by executing the at least one instruction, the processor is configured to:
      receive identifiable information from a plurality of EVSEs associated with at least one supply equipment communication controller (SECC),
      select one of the plurality of EVSEs as a first EVSE,
      perform wireless communication association with the first EVSE,
      perform positioning until the EV is at a location capable of being charged from the first EVSE, and
      perform pairing with the first EVSE so that the EV receives power from the first EVSE, and
   wherein the electronic device is one of a first type or a second type classified according to a distance and a relative location from a power reception device of the EV,
   wherein the electronic device is determined as the first type based on the electronic device is located within a range from the power reception device of the EV, and
   wherein the electronic device is determined as the second type operating differently from the first type in the positioning based on the electronic device is located out of the range from the power reception device of the EV.

2. The electronic device of claim 1, wherein, for the positioning, whether the EV is at the location capable of being charged from the first EVSE is determined in cooperation with a second electronic device mounted on the EV.

3. The electronic device of claim 1, wherein, for the positioning, when a distance between the power reception device of the EV and a power transmission device of the first EVSE is within a predetermined range, a location of the power transmission device is estimated using a location of an electronic device of the first type mounted on the EV which is close to the power reception device, wherein the location of the electronic device of the first type is detected by at least one electronic device of the second type mounted on the first EVSE.

4. The electronic device of claim 1, wherein, for the pairing, when the processor concludes as a result of the positioning that the EV is at the location capable of being charged from the first EVSE, whether the electronic device is to be deactivated is determined according to whether the electronic device is a first type or a second type, which is classified according to a distance and a relative location from the power reception device of the EV.

5. The electronic device of claim 1, wherein, for the pairing, whether the pairing is successful is determined according to whether a verified EV pairing and positioning device identifier (PPDID) extracted from a message received from the first EVSE is consistent with a PPDID of the electronic device.

6. The electronic device of claim 1, wherein, for the wireless communication association, whether the wireless communication association is successful is determined according to whether a vendor-specific element (VSE) field of a message which is received after the first EVSE is selected is consistent with identifiable information of the first EVSE.

7. An electronic device mounted on an electric vehicle supply equipment (EVSE), the electronic device comprising:
   a processor; and
   a memory configured to store at least one instruction to be executed by the processor,
   wherein by executing the at least one instruction, the processor is configured to:
      broadcast identifiable information of the electronic device,
      perform positioning until an electric vehicle (EV) is at a location capable of being charged from the EVSE when wireless communication association is established with the EV that has received the broadcast identifiable information, and perform pairing with a first EVSE so that the EV receives power from the first EVSE, and wherein the electronic device is one of a first type or a second type classified according to a distance and a relative location from a power transmission device of the EVSE, wherein the electronic device is determined as the first type based on the electronic device is located within a range from the power transmission device of the EVSE, and wherein the electronic device is determined as the second type operating differently from the first type in the positioning based on the electronic device is located out of the range from the power transmission device of the EVSE.

8. The electronic device of claim 7, wherein, for the positioning, whether the EV is at the location capable of being charged from the EVSE is determined in cooperation with a second electronic device mounted on the EVSE.

9. The electronic device of claim 7, wherein, for the positioning, when a distance between a power reception device of the EV and the power transmission device is within a predetermined range, a location of the power reception device is estimated, using a location of an electronic device of the first type mounted on the EV which is close to the power reception device from an electronic device of the second type mounted on the EVSE.

10. The electronic device of claim 7, wherein, for the pairing, when the processor concludes as a result of the positioning that the EV is at the location capable of being charged from the EVSE, whether the electronic device is to be deactivated is determined according to whether the electronic device is a first type or a second type, which is classified according to a distance and a relative location from the power transmission device of the EVSE.

11. The electronic device of claim 7, wherein, for the pairing, whether the pairing is successful is determined according to whether a selected EVSE pairing and positioning device identifier (PPDID) extracted from a message received from the EV is consistent with a PPDID of the electronic device.

12. The electronic device of claim 7, wherein a current stage among a sequence of communication association, positioning, and pairing is indicated using a message transmitted to the EV.

13. A communication association, positioning, and pairing method for an electric vehicle (EV) that receives power from an electric vehicle supply equipment (EVSE), the method comprising operations of:

receiving, by at least one electronic device mounted on the EV, identifiable information broadcast from a plurality of EVSEs associated with at least one supply equipment communication controller (SECC);

selecting, by the at least one electronic device, one of the plurality of EVSEs as a first EVSE;

performing, by the at least one electronic device, wireless communication association with the first EVSE;

performing, by the at least one electronic device and the first EVSE, positioning until the EV is at a location capable of being charged from the first EVSE; and performing, by the at least one electronic device and the first EVSE, pairing with the first EVSE so that the EV receives power from the first EVSE, wherein the positioning is performed using the at least one electronic device determined as one of a first type or a second type classified according to a distance and a relative location from a power reception device of the EV, wherein the at least one electronic device is determined as the first type based on the at least one electronic device is located within a range from the power reception device of the EV, and wherein the at least one electronic device is determined as the second type operating differently from the first type in the positioning based on the at least one electronic device is located out of the range from the power reception device of the EV.

14. The method of claim 13, further including, before the operation of performing positioning and after the operation of performing the wireless communication association, operations of:

receiving, by the SECC, a height from the ground of at least one first electronic device mounted on the electric vehicle; and controlling, by the SECC, an automatic connection device side (ACD-S) charging module associated with the first EVSE so that a height of at least one second electronic device from the ground mounted on the first EVSE corresponds to the height of the at least one first electronic device from the ground.

15. The method of claim 13, wherein the operation of performing positioning includes an operation of determining, by the EV, whether the EV is at a location capable of being charged from the first EVSE in cooperation between a plurality of first electronic devices mounted on the EV and a plurality of second electronic devices mounted on the first EVSE.

16. The method of claim 13, wherein when it is determined that the EV is at the location capable of being charged from the first EVSE after the operation of performing positioning, the operation of performing the pairing includes operations of:

determining whether to deactivate each of a plurality of first electronic devices mounted on the EV according to whether each of the plurality of first electronic devices is a first type or a second type, which is classified according to a distance and a relative location from the power reception device of the EV; and determining whether to deactivate each of a plurality of second electronic devices mounted on the first EVSE according to whether each of the plurality of second electronic devices is a first type or a second type, which is classified according to a distance and a relative location from the power transmission device of the first EVSE.

17. The method of claim 13, wherein the operation of performing the pairing includes operations of:

determining, by a second electronic device mounted on the first EVSE, whether the pairing is successful according to whether a selected EVSE pairing and positioning device identifier (PPDID) extracted from a message received from the EV is consistent with a PPDID of a first electronic device mounted on the EV; and determining, by the first electronic device, whether the pairing is successful according to whether a verified EV PPDID extracted from a message received from the first EVSE is consistent with a PPDID of the second electronic device.

18. The method of claim 13, wherein the operation of performing wireless communication association includes operations of:

extracting, by a first electronic device mounted on the EV, a vendor-specific element (VSE) field from a received message after selecting the first EVSE; and determining, by the first electronic device, whether the wireless communication association is successful according to whether the VSE field is consistent with identifiable information of the first EVSE.

* * * * *